(12) United States Patent
Teraoka et al.

(10) Patent No.: US 10,031,370 B2
(45) Date of Patent: Jul. 24, 2018

(54) LIQUID CRYSTAL DISPLAY DEVICE AND METHOD FOR MANUFACURING SAME

(71) Applicant: Sharp Kabushiki Kaisha, Osaka (JP)

(72) Inventors: Yuko Teraoka, Osaka (JP); Hiroyuki Hakoi, Osaka (JP); Masanobu Mizusaki, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 67 days.

(21) Appl. No.: 14/909,658

(22) PCT Filed: Aug. 1, 2014

(86) PCT No.: PCT/JP2014/070343
§ 371 (c)(1),
(2) Date: Feb. 2, 2016

(87) PCT Pub. No.: WO2015/019958
PCT Pub. Date: Feb. 12, 2015

(65) Prior Publication Data
US 2016/0187729 A1    Jun. 30, 2016

(30) Foreign Application Priority Data

Aug. 7, 2013   (JP) ................................ 2013-164555

(51) Int. Cl.
*G02F 1/1337*    (2006.01)
*G02F 1/1341*    (2006.01)

(52) U.S. Cl.
CPC ...... *G02F 1/133711* (2013.01); *G02F 1/1341* (2013.01); *G02F 1/133723* (2013.01); *G02F 2001/13415* (2013.01)

(58) Field of Classification Search
CPC ......... G02F 1/133711; G02F 1/133723; G02F 1/1341; G02F 1/13415
(Continued)

(56) References Cited

U.S. PATENT DOCUMENTS

| | | | |
|---|---|---|---|
| 2011/0068301 A1 | 3/2011 | Akiike et al. | |
| 2015/0029452 A1* | 1/2015 | Ogawa | G02F 1/1337 349/123 |

FOREIGN PATENT DOCUMENTS

| | | |
|---|---|---|
| JP | H6-342137 A | 12/1994 |
| JP | 2009-237018 A | 10/2009 |

(Continued)

*Primary Examiner* — Charles Chang
(74) *Attorney, Agent, or Firm* — Chen Yoshimura LLP

(57) ABSTRACT

A liquid crystal display device includes: a pair of substrates; a liquid crystal layer between the pair of substrates; and an alignment film between at least one of the pair of substrates and the liquid crystal layer, wherein the alignment film includes a first and second component, wherein the first component is a polymer in which at least two types of liquid crystal orientation side chains are bonded to a polysiloxane main chain, wherein the second component is made of at least one of a polyamic acid and a polyimide, wherein the at least two types of liquid crystal orientation side chains include a first side chain having on an end thereof a fluorine atom, and a second side chain that does not have on an end thereof a fluorine atom, wherein a proportion of the first component to a total amount of the second component is 2 mass % or greater, and wherein, in the liquid crystal display device, liquid crystal is sealed between the pair of substrates by a One Drop Fill scheme.

5 Claims, 11 Drawing Sheets

(58) Field of Classification Search
USPC .................................................. 349/123–129
See application file for complete search history.

(56)  References Cited

FOREIGN PATENT DOCUMENTS

| | | |
|---|---|---|
| JP | 2010-140010 A | 6/2010 |
| JP | 2012-141567 A | 7/2012 |
| WO | 2009/025385 A1 | 2/2009 |

* cited by examiner 214   215

214
215

(a) (b) (c)

LIQUID CRYSTAL DISPLAY DEVICE AND METHOD FOR MANUFACURING SAME

TECHNICAL FIELD

The present invention relates to a liquid crystal display device, a method of manufacturing the same, and a liquid crystal orientation agent. More specifically, the present invention relates to a liquid crystal display device in which alignment films that control the orientation of liquid crystal molecules are formed, a method for manufacturing the same, and a liquid crystal orientation agent that is the material for the alignment films.

BACKGROUND ART

Liquid crystal display devices are display devices that use a liquid crystal composition for display. A representative display method therefor is one in which the light transmission amount is controlled by applying a voltage to the liquid crystal composition sealed between a pair of substrates to change the orientation state of the liquid crystal molecules in the liquid crystal composition according to the applied voltage. Such liquid crystal display devices exploit advantages such as being thin, lightweight, and exhibiting low power consumption, and are used in a wide range of areas.

When voltage is not being applied, the orientation of the liquid crystal molecules is generally controlled by alignment films formed on the surfaces of the substrates. Conventionally, polyamic acid and polyimides have been widely used as the material for the alignment films (liquid crystal orientation agent). Among organic resins, polyamic acid and polyimides exhibit excellent physical characteristics in areas such as durability against heat, an affinity for liquid crystal, and mechanical strength. However, as the number of applications for liquid crystal panels increases and the usage environment becomes more diverse, a material with even better durability against heat has been sought after. An alignment film that uses a polymer with a polysiloxane as the main framework has been proposed (see Patent Documents 1 and 2, for example).

Patent Document 1 discloses a vertical alignment film having a siloxane structure and a thermal crosslinking group (epoxy group) that uses an alignment film material containing a liquid crystal orientation side chain having a carbon-carbon double bond that is bonded to silicon, thereby improving vertical alignment and reducing unevenness resulting from the liquid crystal dripping step.

Patent Document 2 discloses a liquid crystal orientation agent containing at least one type selected from a group including a polysiloxane having a side chain of a specific structure in a repeating unit, a hydrolyzate thereof, and a hydrolyzate condensate, and containing a reaction product with a specific compound. Patent Document 2 also discloses that the liquid crystal orientation agent may further contain at least one type selected from a group including polyamic acid and a polyimide, and that the liquid crystal orientation agent is used in a liquid crystal display element.

As a method of filling the liquid crystal panel with liquid crystal, the vacuum injection method and the one drop fill (ODF) method are widely known. The vacuum injection method relies on capillary action and injecting liquid crystal into a large display such as a television receiver or signage, in particular, but this method requires a considerable amount of time, and it is especially difficult for liquid crystal to spread in a vertical alignment liquid crystal panel, which has made it very difficult to introduce the liquid crystal. Thus, the ODF method has been in primary use when manufacturing large substrates/panels. FIGS. 15 and 16 are for describing ODF. FIG. 15 shows a state in which liquid crystal droplets are dripped onto one substrate, and FIG. 16 shows a state in which the pair of substrates are bonded together in a vacuum and the liquid crystal droplets spread under pressure across the entire surface of the substrates. As shown in FIG. 15, by the ODF method, after a necessary amount of liquid crystal droplets 31 is dripped onto prescribed locations on one substrate on which an alignment film is formed, the other substrate is bonded to the one substrate in a vacuum and the liquid crystal droplets 31 are spread under pressure throughout the entire surface of the substrates as shown in FIG. 16, and the surrounding sealing member is cured by ultraviolet light, heat, or a combination thereof, thereby filling in the space to the inside of the sealing member with liquid crystal.

On the other hand, when ODF was used, this sometimes resulted in a particular type of display unevenness. Specifically, this resulted in uneven display color depending on the position where the liquid crystal droplets were dripped or the shape and pressure when the liquid crystal droplets are spreading. As a countermeasure, by introducing an additive to the polyimide alignment film material, the spread of liquid crystal droplets on the alignment film is facilitated, and this has been proposed as a method of eliminating unevenness when dripping liquid crystal (see Patent Documents 3 and 4, for example). However, because a polyimide alignment film material was used, there was room for improvement in reliability. In addition, in order to reduce unevenness when dripping liquid crystal, a method of further facilitating the spread of liquid crystal droplets on the alignment film has been sought after.

RELATED ART DOCUMENTS

Patent Documents

Patent Document 1: Japanese Patent Application Laid-Open Publication No. 2012-141567
Patent Document 2: WO 2009/025385
Patent Document 3: Japanese Patent Application Laid-Open Publication No. H6-342137
Patent Document 4: Japanese Patent Application Laid-Open Publication No. 2009-237018

SUMMARY OF THE INVENTION

Problems to be Solved by the Invention

Up to now, various causes for uneven dripping of liquid crystal by the ODF method have been considered, and among these causes, the biggest cause was thought to be the uneven load on the alignment film when the liquid crystal droplets are spread when the two substrates are bonded. Thus, in order to reduce unevenness in dripping, attention has been paid to improving the ease with which discharged liquid crystal droplets are spread without forming a load on the alignment films.

In recent liquid crystal display devices, in order to handle increased screen size and high frequency driving such as used in 3D display, high speed responsiveness is necessary, and thus, a low viscosity liquid crystal material is suitable for use in this case. Droplets of a low viscosity liquid crystal material spread easily, and thus, were seen as a suitable material against dripping unevenness. However, as a result of studies by the inventors of the present invention, it was found that unevenness is caused by a mode in which unevenness is not alleviated despite the ease with which the liquid crystal droplets spread.

As shown in FIG. 17, for example, in a vacuum prior to the liquid crystal droplets spreading, certain liquid crystal components volatilize, which results in the liquid crystal component ratio varying depending on the location, which results in unevenness. In addition, when the liquid crystal droplets spread, unevenness occurs due to the chromatography phenomenon or the opposite phenomenon of sweeping. Furthermore, unevenness also occurs because of the alignment films having an insufficient ability to control orientation. FIGS. 18(a), 18(b), and 18(c) show examples of display unevenness.

In low viscosity liquid crystal, the proportion of low viscosity components among the components of the liquid crystal is increased compared to typical liquid crystal material. In order to reduce the viscosity, the low viscosity components are often constituted of molecules that have low intermolecular force and a low molecular weight. Such low viscosity components have the characteristic of being susceptible to volatilization. In other words, the low viscosity components in the low viscosity liquid crystal volatilize from the surface of the liquid crystal droplets when exposed to a vacuum during the ODF step, which results in the low viscosity effect, which is sought after, to not be achieved. Furthermore, the droplets of low viscosity liquid crystal spread more quickly than conventional liquid crystal droplets, which results in greater surface area, and therefore, increased volatility.

The degree of volatility of the low viscosity components depends on the degree of vacuum. If the degree of vacuum in the chamber of the ODF device is not uniform, then the degree of volatility also becomes non-uniform, and as a result, the ratio of components in the liquid crystal composition becomes uneven. As a result, the viscosity and electro-optical characteristics of the liquid crystal become non-uniform, resulting in unevenness. In order to adjust the degree of vacuum when bonding together the substrates, successive improvements have been made on the device and process, but there were limits to improvements achieved thereby, due to the increased size of the substrates.

The present invention takes into account the above situation, and an object thereof is to provide a liquid crystal display device including alignment films suited to the even spread of liquid crystal droplets when performing the liquid crystal dripping method (ODF), and having excellent uniformity of display, a method of manufacturing a liquid crystal display device in which such an alignment film can be formed, and a liquid crystal orientation agent.

Means for Solving the Problems

The inventors of the present invention have considered various alignment films suited to the even spread of liquid crystal droplets during ODF, and initially focused on alignment films that use only side chains having fluorine atoms on the ends thereof (hereinafter referred to as "fluorine-terminated side chains"). If alignment films using only fluorine-terminated side chains are used, the hydrophobic characteristics thereof result in the liquid crystal droplets dripped thereon to spread more easily, enabling a reduction in surface area. Thus, it is possible to reduce the surface area of the liquid crystal droplets exposed to the vacuum, resulting in decreased volatility of liquid crystal components in the vacuum, enabling changes in the liquid crystal composition in the liquid crystal droplets to be mitigated. FIG. 19 shows a case in which the surface area of the liquid crystal droplets is large and volatility is high, whereas FIG. 20 shows a case in which the surface area of the liquid crystal droplets is small and volatility is low. In this manner, a liquid crystal display device is attained in which the component ratio of the liquid crystal composition does not change, with low susceptibility to the effect of an uneven vacuum during the ODF step, resulting in the liquid crystal display device having high speed responsiveness with no display unevenness. Furthermore, because of the alignment film using only fluorine-terminated side chains, it is possible to attain a surface of the alignment film having excellent vertical alignment as a result of the hydrophobic characteristics of the fluorine terminus. FIG. 21 shows a state in which the vertical alignment of the surface of the alignment film is insufficient with alignment disorder occurring when the liquid crystal is spreading, and FIG. 22 shows a state in which the vertical alignment of the surface of the alignment film is sufficient with no alignment disorder occurring when the liquid crystal is spreading. The long axes of liquid crystal molecules 32 in FIG. 22 all face the same direction as the one-dot-chain line shown in FIG. 22 and are all aligned in parallel with each other. By contrast, the long axes of the liquid crystal molecules in FIG. 21 do not all face the same direction.

On the other hand, while it is possible to mitigate unevenness when dripping the liquid crystal droplets with alignment films using only fluorine-terminated side chains, the surface tension of the alignment film material is high, which means that when coating the substrate with the alignment film material (referred to as "alignment film ink" if coated by the inkjet method), the alignment film material does not spread, and thus, it was difficult to form a uniform alignment film. As a result, there was a problem that unevenness occurred due to the non-uniform thickness of the alignment film. In particular, this is seen as nozzle marks in the inkjet method. Thus, whereas unevenness when dripping the liquid crystal droplets was eliminated, display unevenness occurred as a result of another reason, namely the unevenness of the alignment film, and thus, in the end it was not possible to attain uniform display.

On the other hand, if only side chains that do not have fluorine atoms on the ends thereof (also referred to below as "non-fluorine-terminated side chains") are present, then the alignment film ink has lower surface tension, making it suitable for coating, and a uniform alignment film can be formed on the substrate. In other words, unevenness resulting from a non-uniform alignment film does not occur. However, if an alignment film only having non-fluorine-terminated side chains is used, this also results in the following problems. While alignment films having only non-fluorine-terminated side chains have surfaces with hydrophobic characteristics in a manner similar to alignment films having only fluorine-terminated side chains, the hydrophobic characteristics are weaker than with fluorine-terminated side chains. Thus, the liquid crystal droplets spread widely, resulting in dripping unevenness. In order to overcome this problem, bulky side chain termini or a long chain alkyl group is used as a means to improve hydrophobic characteristics of the non-fluorine-terminated side chain. However, bulky side chain termini such as steroids represented by cholestane, for example, cannot react to light even if the an attempt is made to cause the photosensitive portion thereof to react to light, due the bulkiness. As a result, reaction to light is inhibited, and orientation control in a desired azimuth direction is not applied, which makes such side chain termini unsuited for side chains having a photosensitive portion. In addition, because of the degree of freedom of the long chain alkyl group, it is difficult to maintain stable vertical alignment characteristics. Specifically, as a result of folding in the long chain alkyl portion, the alignment characteristics cannot be maintained, and when voltage is applied to the liquid crystal, for example, the long chain alkyl is knocked over along with the liquid crystal molecules, and if the orientation thereof remains in that state, this results in increased susceptibility to burn-in. From the reasons above, an alkyl group of an appropriate size is suitable for the non-fluorine-terminated side chain, but sufficient hydrophobic characteristics cannot be attained by such non-fluorine-terminated side chains alone, and it was not possible to eliminate dripping unevenness.

As described above, based on study by the inventors of the present invention, it was found that with the alignment film having only fluorine-terminated side chains, it was difficult to attain a liquid crystal display device that achieves a balance between preventing dripping unevenness during ODF and preventing uneven thickness during coating of the alignment film, and that displays images uniformly without display unevenness. It was similarly found that it was difficult to achieve such a balance with an alignment film that has only non-fluorine-terminated side chains.

Upon diligent study, the inventors of the present invention arrived at using an alignment film that includes a polymer component (first component) having a structure in which at least one fluorine-terminated side chain and at least one non-fluorine-terminated side chain are bonded to a polysiloxane main chain, and a component (second component) that contains at least one type selected from a group including polyamic acid and a polyimide.

Patent Document 2 discloses a structure of a side chain in which many polysiloxane main chains are introduced, and includes an alignment film that contains such components as described above. These correspond to Working Examples IE-133 to IE-137 in table 20 on page 204 of Patent Document 2, and Working Examples ArIE-6 and ArIE-7 in table 24 on page 209. However, Patent Document 2 does not address marks from liquid crystal dripping or ink coatability.

Upon considering alignment films that can achieve a balance in terms of preventing uneven thickness when coating the alignment film, the inventors of the present invention found an alignment film that contains the first component and the second component as described above, and that it is possible to attain a liquid crystal display device that consequently is highly reliable. In the course of this study, it was found that by keeping the ratio of the first component to the second component within a certain range, it is possible to attain a liquid crystal display device that has both excellent display performance with no display unevenness and good reliability. In this manner, the inventors of the present invention have arrived at a solution that elegantly solves the above-mentioned problem, and have arrived at the present invention.

That is, one aspect of the present invention is a liquid crystal display device, including: a pair of substrates; a liquid crystal layer sandwiched between the pair of substrates; and an alignment film disposed between at least one of the pair of substrates and the liquid crystal layer, wherein the alignment film includes a first component and a second component, wherein the first component is a polymer in which at least two types of liquid crystal orientation side chains are bonded to a polysiloxane main chain, wherein the second component is made of at least one of a polyamic acid and a polyimide, wherein the at least two types of liquid crystal orientation side chains include a first side chain having on an end thereof a fluorine atom, and a second side chain that does not have on an end thereof a fluorine atom, wherein a proportion of the first component in relation to a total amount of the second component is 2 mass % or greater, and wherein, in the liquid crystal display device, liquid crystal is sealed between the pair of substrates by a One Drop Fill scheme.

Another aspect of the present invention is a method of manufacturing a liquid crystal display device, including: preparing a pair of substrates; forming an alignment film on a surface of at least one of the pair of substrates; and forming a liquid crystal layer between the pair of substrates, wherein the alignment film includes a first component and a second component, wherein the first component is a polymer in which at least two types of liquid crystal orientation side chains are bonded to a polysiloxane main chain, wherein the second component is made of at least one of a polyamic acid and a polyimide, wherein the at least two types of liquid crystal orientation side chains include a first side chain having on an end thereof a fluorine atom, and a second side chain that does not have on an end thereof a fluorine atom, wherein a proportion of the first component in relation to a total amount of the second component is 2 mass % or greater, and wherein the step of forming the liquid crystal layer between the pair of substrates includes sealing liquid crystal between the pair of substrates by a One Drop Fill scheme.

Yet another aspect of the present invention is a liquid crystal orientation agent, including: a first component that is a polymer in which at least two types of liquid crystal orientation side chains are bonded to a polysiloxane main chain; and a second component contains at least one of a polyamic acid and a polyimide, wherein the at least two types of liquid crystal orientation side chains include a first side chain having on an end thereof a fluorine atom, and a second side chain that does not have on an end thereof a fluorine atom, wherein a proportion of the first component contained is 2 mass % or greater in relation to a total amount of the second component contained.

Effects of the Invention

The liquid crystal display device of the present invention includes the alignment films as described above, and thus, it is possible to spread the liquid crystal droplets evenly during the liquid crystal dripping process (ODF) and to realize high display quality. In the method of manufacturing the liquid crystal display device of the present invention, the above-mentioned alignment films are formed, and thus, it is possible to spread the liquid crystal droplets evenly during ODF and to manufacture a high display quality liquid crystal display device. Additionally, the liquid crystal orientation agent of the present invention has the above-mentioned composition, and thus, it is possible to spread the liquid crystal droplets evenly during ODF and to manufacture a high display quality liquid crystal display device.

DETAILED DESCRIPTION OF EMBODIMENTS

Below, embodiments of the present invention will be explained. The present invention is not limited to the embodiments below, and design modifications can be made as appropriate within a scope that satisfies the configuration of the present invention.

The liquid crystal display device of the present embodiment has a pair of substrates, a liquid crystal layer sandwiched between the pair of substrates, and an alignment film disposed between at least one of the substrates and the liquid crystal layer. The alignment film contains a first component and a second component, the first component is a polymer in which at least two liquid crystal orientation side chains are bonded to a polysiloxane main chain, the second component includes polyamic acid and/or a polyimide, the at least two liquid crystal orientation side chains include a first side chain having a fluorine atom at the end thereof and a second side chain that does not have a fluorine atom at the end thereof, the proportion of the first component contained is 2 mass % or greater relative to the total amount of the second component, and the liquid crystal display device has liquid crystal sealed between the pair of substrates by a method by which liquid crystal is dripped and the substrates are bonded to each other.

<Configuration of Liquid Crystal Display Device>

A liquid crystal display device of the present embodiment is constituted of a plurality of members such as: a liquid crystal display panel; external circuits such as a tape carrier package (TCP) and a printed circuit board (PCB); optical films such as a viewing angle expansion film and a brightness enhancement film; a backlight unit; and a bezel (frame), and depending on the member, the member may be built into another member. There is no special limitation on members other than the liquid crystal display panel, and members in general use in the field of liquid crystal display devices can be used. Thus, descriptions thereof are omitted.

Figure 1:
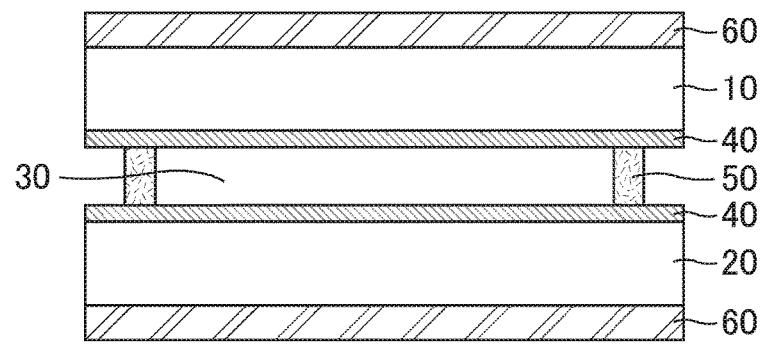
FIG. 1 is a schematic cross-sectional view showing a liquid crystal display device according to an embodiment.
Figure 2:
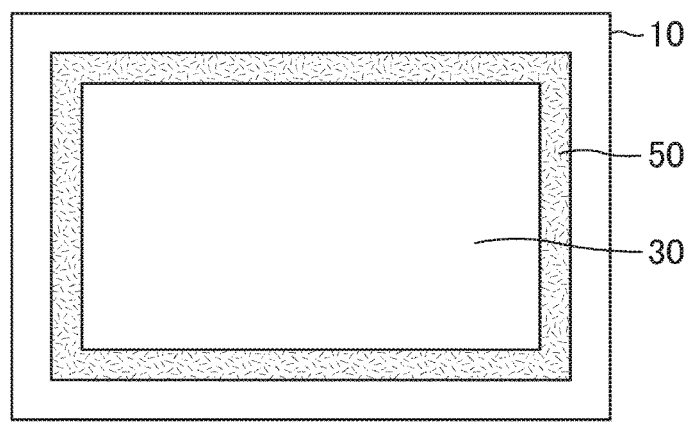
FIG. 2 is a schematic plan view showing the liquid crystal display device according to an embodiment.

FIG. 1 is a schematic cross-sectional view showing a liquid crystal display device according to an embodiment, and FIG. 2 is a schematic plan view showing the liquid crystal display device according to an embodiment. As shown in FIG. 1, the liquid crystal display device of the present embodiment has a pair of substrates 10 and 20 with a liquid crystal layer 30 sealed between the pair of substrates 10 and 20. Electrodes for applying voltage to the liquid crystal layer 30 are provided on either or both of the pair of substrates 10 and 20. An alignment film 40 is interposed between at least one of the pair of substrates 10 and 20, and the liquid crystal layer 30. In FIG. 1, alignment films 40 are provided both between one substrate 10 and the liquid crystal layer 30 and between the other substrate 20 and the liquid crystal layer 30, but may be provided only on one substrate. When no voltage is being applied to the liquid crystal layer 30 through the electrodes, the orientation of the liquid crystal layer 30 is primarily controlled by the alignment films 40, and when voltage is being applied to the liquid crystal layer 30 through the electrodes, the orientation of the liquid crystal molecules in the liquid crystal layer 30 changes according to the size of the applied voltage.

The pair of substrates 10 and 20 are bonded together by a sealing member 50. As shown in FIG. 2, the sealing member 50 is arranged so as to surround the perimeter of the liquid crystal layer 30. In the liquid crystal display panel of the present embodiment, liquid crystal is sealed between the pair of substrates according to a dripping/bonding method, and thus, unlike a liquid crystal display panel manufactured by vacuum injection, no opening for liquid crystal injection is formed in a portion of the sealing member 50, and no process to seal such an opening is performed. In other words, the sealing member 50 is disposed around the perimeter of the liquid crystal layer 30 without any gaps so as to seal in the liquid crystal material constituting the liquid crystal layer 30.

Polarizing plates 60 are disposed, respectively, on the outer sides of the liquid crystal display panel, which are opposite to the sides of the substrates 10 and 20 on which the alignment films 40 are disposed. An optical film such as a phase shift film may be disposed between the polarizing plates 60 and the substrates 10 and 20.

A combination of an active matrix substrate and a color filter substrate is one example of the pair of substrates 10 and 20. An active matrix substrate in general use in the field of liquid crystal display devices can be used. In an example of a plan view configuration of the active matrix substrate, the following are provided on a transparent substrate: a plurality of parallel gate signal lines; a plurality of source signal lines formed parallel to each other and extending in a direction perpendicular to the gate signal lines; thin film transistors disposed at respective intersections between the gate signal lines and the source signal lines; pixel electrodes arranged in a matrix in regions delineated by the gate signal lines and the source signal lines; and the like.

A color filter substrate in general use in the field of liquid crystal display devices can be used. An example of a configuration of the color filter substrate is provided with the following on a transparent substrate: a black matrix formed in a grid pattern; color filters formed inside the grid cells, or in other words, the pixels; a common electrode formed so as to cover the black matrix and the color filters; and the like.

Alternatively, a configuration may be adopted for the pair of substrates 10 and 20 in which both the color filters and the active matrix are formed on one substrate and the common electrode is provided on the other substrate.

The transparent substrates used for the active matrix substrate and the color filter substrate is made of glass such as float glass or soda glass; a plastic such as polyethylene terephthalate, polybutylene terephthalate, polyethersulfone, polycarbonate, or alicyclic polyolefin; or the like.

The pixel electrodes on the active matrix substrate and the common electrode on the color filter substrate are normally formed below the respective alignment films. The pixel electrodes and the common electrode are made of a transparent conductive material such as indium tin oxide (ITO) or indium zinc oxide (IZO), for example.

A nematic liquid crystal, a smectic liquid crystal, or the like can be used for the liquid crystal layer 30. If the liquid crystal display element has TN liquid crystal cells or STN liquid crystal cells, it is preferable that a nematic liquid crystal having positive dielectric anisotropy (positive liquid crystal) be used. Examples thereof include a biphenyl liquid crystal, a phenylcyclohexane liquid crystal, an ester liquid crystal, a terphenyl liquid crystal, a biphenylcyclohexane liquid crystal, a pyrimidine liquid crystal, a dioxane liquid crystal, a bicyclooctane liquid crystal, a cubane liquid crystal, or the like. To this liquid crystal, the following may further be added: a cholesteric liquid crystal such as cholestyl chloride, cholesteryl nonanoate, or cholesteryl carbonate; a chiral agent including those sold under product names C-15 and CB-15 (made by Merck); a ferroelectric liquid crystal such as p-desiloxybenzylidene-p-amino-2-methylbutyl cinnamate; or the like. On the other hand, in the case of vertical alignment liquid crystal cells, it is preferable that a nematic liquid crystal having negative dielectric anisotropy (negative liquid crystal) be used. Examples thereof include a pyridazine liquid crystal, a Schiff base liquid crystal, an azoxy liquid crystal, a biphenyl liquid crystal, a phenylcyclohexane liquid crystal, or the like.

When the display mode of the liquid crystal display device is the vertical alignment (VA) mode, the liquid crystal layer 30 contains liquid crystal molecules having negative dielectric anisotropy, and the alignment films 40 are vertical alignment films. If the voltage applied to the liquid crystal layer 30 is in the OFF state, that is, below a threshold voltage, the liquid crystal molecules are oriented substantially perpendicular to the surfaces (substrate surfaces) of the alignment films 40. When the voltage applied to the liquid crystal layer 30 is in the ON state, that is, above the threshold voltage, the liquid crystal molecules have negative dielectric anisotropy, and thus, are reoriented towards a direction parallel to the substrate surface according to the applied voltage. In this manner, the liquid crystal layer 30 exhibits birefringence towards transmitted light. It is preferable that the pretilt angle of the liquid crystal molecules in the vicinity of the alignment films 40 be 86° or greater and less than 90°, and it is even more preferable that the pretilt angle be 89.5° or less. In the present specification, "pretilt angle" refers to the angle of incline of the liquid crystal molecules with respect to the direction parallel to the substrate surfaces, with the direction parallel to the substrate surface being at a 0° angle, and the line normal to the substrate surface being at a 90° angle.

The alignment films 40 have the function of controlling the orientation of the liquid crystal molecules in the liquid crystal layer 30. Details will be described in detail below.

An epoxy resin or the like containing an inorganic filler or an organic filler and a curing agent, for example, can be used as the sealing member 50.

Typically, the polarizing plates 60 are made by adsorption orientation of an anisotropic material such as an iodine complex having dichroism to a polyvinyl alcohol (PVA) film. Generally, a protective film such as a triacetyl cellulose film is laminated on both sides of the PVA film for usability.

<Configuration of Alignment Film>

The alignment film contains a polymer in which at least two types of liquid crystal orientation side chains are bonded to a polysiloxane main chain as a first component, and either or both of polyamic acid and a polyimide as a second component. It is preferable that the alignment film contain the first component primarily towards the liquid crystal layer and the second component primarily towards the substrate, and that the alignment film have a two-layer structure including an upper layer constituted of the liquid crystal orientation polysiloxane, and a lower layer including either or both of polyamic acid and a polyimide.

The proportion of the first component (also referred to below as "denaturation ratio") in the alignment film in relation to the total amount of the second component is 2 mass % or greater. If the denaturation ratio is less than 2 mass %, this results in the orientation strength of the surface of the alignment film being weakened. In such a case, when the two substrates are bonded together and the liquid crystal droplets spread, an uneven pressure load is applied on the film surface by the liquid crystal, damaging the orientation ability of the alignment film and resulting in uneven dripping. In addition, it is preferable that the denaturation ratio be less than or equal to 30 mass %. If the denaturation ratio exceeds 30 mass %, this poses a risk that the electrical characteristics such as residual DC are decreased. It is preferable that the denaturation ratio be 2.5 mass % or greater and even more preferable that the denaturation ratio be 3 mass % or greater. Within this range, a more stable orientation strength is attained, and it is possible to sufficiently mitigate the occurrence of unevenness in dripping. It is preferable that the denaturation ratio be less than 28 mass % and even more preferable that the denaturation ratio be less than 25 mass %. Within this range, it is possible to attain with a high degree of reproducibility a liquid crystal display device with excellent electrical characteristics and a high degree of reliability.

A) First Component of Alignment Film

The first component of the alignment film is a polymer in which at least two types of liquid crystal orientation side chains are bonded to the polysiloxane main chain, and the at least two types of liquid crystal orientation side chains include a first side chain having a fluorine atom on the end and a second side chain that does not have a fluorine atom on the end. The first side chain is constituted of at least one type of side chain, and may be constituted only of one type of side chain or may be constituted of two or more types of side chains. Similarly, the second side chain is also constituted of at least one type of side chain, and may be constituted only of one type of side chain or may be constituted of two or more types of side chains.

For the polymer, a polysiloxane to which the liquid crystal orientation side chain is not bonded (also referred to below as "reactive polysiloxane") may be attained as a product of a reaction between a compound having on the end thereof a fluorine atom (also referred to below as a "compound for the first side chain") and a compound that does not have on the end thereof a fluorine atom (also referred to below as a "compound for the second side chain").

1. Reactive Polysiloxane

An example of the reactive polysiloxane is one having a repeated unit represented in the following formula (1).

<Chemical Formula 1>

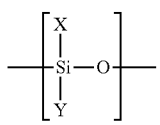

(1)

There is no special limitation on "X" in formula (1), but it is preferable that "X" be a group including an epoxy group. Examples of such a group include the group represented in the following formula (2) and the group represented in the following formula (3).

<Chemical Formula 2>

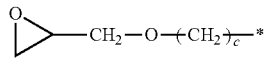

(2)

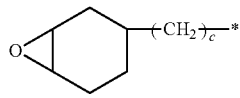

(3)

The "c" in formulae (2) and (3) is an integer of 1 to 10, and "*" indicates that the bond marked therewith is a bond with a silicon atom. By the epoxy group in "X" above reacting with the carboxyl group in the compound for the first side chain and the compound for the second side chain, a liquid crystal orientation polysiloxane is produced, for example. The alicyclic epoxy compound such as the group represented in formula (3) easily reacts with acids.

There is no special limitation on "Y" in formula (1). Examples of "Y" include a hydroxyl group, an alkoxyl group having a carbon number of 1 to 10, an alkyl group having a carbon number of 1 to 6, and an aryl group having a carbon number of 6 to 10. Preferable examples of "Y" are the hydroxyl group and the alkoxyl group having a carbon number of 1 to 10. More specific examples include a methoxyl group, an ethoxyl group, and the like.

The reactive polysiloxane is a commercially available product and can be obtained as such, or can be synthesized by appropriately combining organic chemistry methods. Also, the method disclosed in Patent Document 2 may be used as the method of producing the reactive polysiloxane.

2. Compound for First Side Chain

An example of a compound for the first side chain is one having the chemical structure represented in the following formula (4).

$$R^1-C_6H_4-COO-C_6H_4-CH=CH-COOH \quad (4)$$

In formula (4), $R^1$ represents a fluorine-containing group with a carbon number of 1 to 20.

Examples of the fluorine-containing group with a carbon number of 1 to 20 in $R^1$ include fluoroalkyl groups such as a trifluoromethyl group; a perfluoroethyl group; a 3,3,3-trifluoropropyl group; a 4,4,4-trifluorobutyl group; a 4,4-5,5,5-pentafluoropentyl group; and a 4,4-5,5-6,6,6-heptafluorohexyl group.

A suitable example of a compound for the first side chain compound is represented in the following formulae (5), (6), and (7).

<Chemical Formula 3>

(5)

$R^2-O-\phantom{X}-COO-\phantom{X}-CH=CH-COOH$ (6)

$R^2-COO-\phantom{X}-COO-\phantom{X}-CH=CH-COOH$ (7)

$R^2-\phantom{X}-COO-\phantom{X}-CH=CH-COOH$

In the formula, $R^2$ represents the fluoroalkyl group having a carbon number of 1 to 10.

The compound for the first side chain contains the structure represented by $C_6H_4$—CH=CH—CO, and thus, can exhibit orientation control by photoalignment.

The compound for the first side chain is a commercially available product and can be obtained as such, or can be synthesized by appropriately combining organic chemistry methods. In addition, the method disclosed in Patent Document 2 may be used as the method of producing the compound for the first side chain.

3. Compound for Second Side Chain

An example of a compound for the second side chain is one having the chemical structure represented in the following formula (8).

$$R^3—R^4—COO—C_6H_4—CH=CH—COOH \tag{8}$$

In formula (1), $R^3$ represents an alkyl group with a carbon number of 4 to 10, and $R^4$ represents a group that results from two hydrogen atoms being removed from an alicyclic hydrocarbon with a carbon number of 6 to 10.

Examples of the alkyl group with a carbon number of 4 to 10 in $R^3$ include an n-butyl group, an n-pentyl group, an n-hexyl group, an n-octyl group, an n-decyl group.

Examples of the alicyclic hydrocarbon with a carbon number of 6 to 10 in $R^4$ include saturated hydrocarbons (cycloalkanes) such as cyclohexane, cycloheptane, and cyclooctane; and unsaturated hydrocarbons such as cycloalkene and cycloalkyne. The alicyclic hydrocarbon may be monocyclic or polycyclic.

A suitable example of a compound for the second side chain compound is represented in the following formula (9).

<Chemical Formula 4>

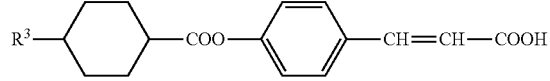

(9)

In the formula, $R^3$ represents the alkyl group having a carbon number of 4 to 10.

Similar to the compound for the first side chain, the compound for the second side chain contains the structure represented by $C_6H_4$—CH=CH—CO, and thus, can exhibit orientation control force as a result of photoalignment.

The compound for the second side chain is a commercially available product that can be obtained as such, or can be synthesized by appropriately combining organic chemistry methods. Also, the method disclosed in Patent Document 2 may be used as the method of producing the compound for the second side chain.

4. Formation Reaction for Liquid Crystal Orientation Polysiloxane

By the reactive polysiloxane and the compound for the first side chain reacting with the compound for the second side chain, the liquid crystal orientation polysiloxane is obtained. In the reactive polysiloxane, a side chain may be formed by reacting not only the compound for the first side chain and the compound for the second side chain but other compounds. Only one type of compound may be used for the first side chain or a plurality of types of compounds may be used. Similarly, only one type of compound may be used for the second side chain or a plurality of types of compounds may be used.

It is preferable that the formation reaction of the liquid crystal orientation polysiloxane be performed with a catalyst being present. A publicly known compound can be used as a so-called curing accelerator that accelerates the reaction between the carboxyl group and an organic base or an epoxy group, for example.

The formation reaction can be performed with an organic solvent being present as necessary. For the organic solvent, it is preferable that an ether compound, an ester compound, or a ketone compound be used, for example, from the perspective of the solubility of the raw material and product, and the ease of formation of the product.

B) Second Component of Alignment Film: Polyamic Acid, Polyimide

The second component of the alignment film contains either or both of polyamic acid and a polyimide. The polyamic acid of the second component may be only one type of polyamic acid or two or more types of polyamic acid. Similarly, the polyimide of the second component may be only one type of polyimide or two or more types of polyimide.

1. Polyamic Acid

The polyamic acid can be attained by reacting a tetracarboxylic dianhydride with diamine.

Examples of the tetracarboxylic dianhydride that can be used to synthesize the polyamic acid include: 1,3,3a,4,5,9b-hexahydro-5-(tetrahydro-2,5-dioxo-3-furanyl)-nafto[1,2-c]-furan-1,3-dione; 1,3,3a,4,5,9b-hexahydro-5-(tetrahydro-2,5-dioxo-3-furanyl)-8-methyl-nafto[1,2-c]-furan-1,3-dione; 2,3,5-tricarboxy cyclopentyl acetic acid dianhydride; butane tetracarboxylic dianhydride; 1,3-dimethyl-1,2,3,4-cyclobutane tetracarboxylic dianhydride; 1,2,3,4-cyclobutane tetracarboxylic dianhydride; pyromellitic dianhydride; 3,3',4,4'-biphenyl sulfone tetracarboxylic dianhydride; 1,4,5,8-naphtalene tetracarboxylic dianhydride; 2,3,6,7-naphthalene tetracarboxylic dianhydride; and 3,3',4,4'-biphenyl ether tetracarboxylic dianhydride. One of such tetracarboxylic dianhydrides can be used, or two or more thereof can be combined.

Examples of diamines that can be used to synthesize the polyamic acid include p-phenylenediamine; 4,4'-diaminodiphenylmethane; 1,5-diaminonaphthalene; 2,7-diaminofluorene; 4,4'-diaminodiphenyl ether; 4,4'-(p-phenylene isopropylidene)bisaniline; 2,2-bis[4-(4-aminophenoxy)phenyl] hexafluoropropane; 2,2-bis(4-aminophenyl) hexafluoropropane; 2,2-bis[4-(4-amino-2-trifluoromethyl phenoxy)phenyl]hexafluoropropane; 4,4'-diamino-2,2'-bis (trifluoromethyl)biphenyl; 4,4'-bis[(4-amino-2-trifluoromethyl)phenoxy]-octafluorobiphenyl; 1-hexadecyloxy-2,4-diaminobenzene; 1-octadecyloxy-2,4-diaminobenzene; 1-cholesteryloxy-2,4-diaminobenzene; 1-cholestanyloxy-2,4-diaminobenzene; hexadecyloxy(3,5-diaminobenzoyl); octadecyloxy(3,5-diaminobenzoyl); cholesteryloxy(3,5-diaminobenzoyl); cholestanyloxy(3,5-diaminobenzoyl); and the diamines represented in formulae (10) to (13) below. "y" in formula (13) below is an integer of 2 to 12. One of such diamines can be used, or two or more thereof can be combined.

<Chemical Formula 5>

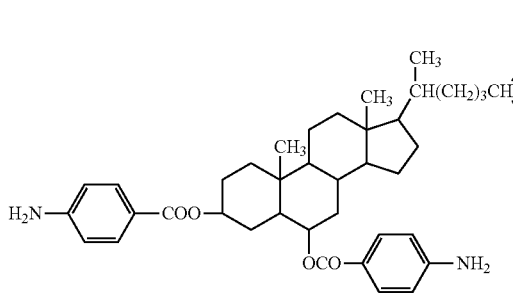

(10)

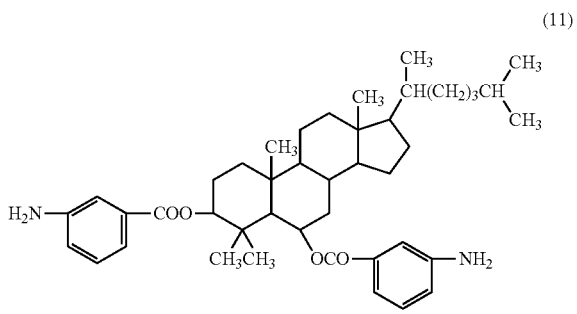

(11)

<Chemical Formula 6>

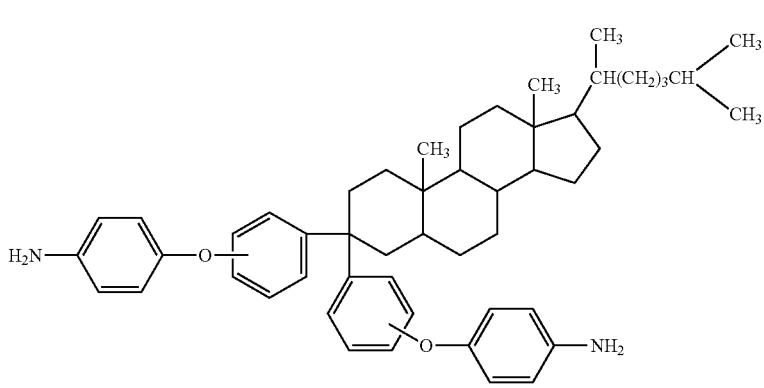

(12)

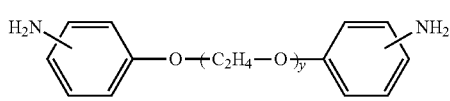

(13)

It is preferable that the synthesis reaction of the polyamic acid occur in an organic solvent. The reaction solution formed by dissolving the polyamic acid may be used as is to prepare the liquid crystal orientation agent, may be used to prepare the liquid crystal orientation agent after isolating the polyamic acid included in the reaction solution, or may be used to prepare the liquid crystal orientation agent after purifying the isolated polyamic acid.

2. Polyimide

The polyimide can be produced by dehydrative cyclization of an amic acid structure having the polyamic acid obtained as described above. At this time, the entire amic acid structure may be completely imidized by dehydrative cyclization, or a partial imide compound may be formed in which only a portion of the amic acid structure undergoes dehydrative cyclization and the amic acid structure and imide structure coexist.

The dehydrative cyclization of the polyamic acid is performed by (i) a method of heating the polyamic acid, or (ii) adding a dehydrating agent or a dehydrative cyclization catalyst in a solution formed by dissolving the polyamic acid in the organic solvent and heating this solution as necessary.

The polyimide obtained by the method (i) may be provided as is for preparation of the liquid crystal orientation agent, or the obtained polyimide may be purified and then provided for preparation of the liquid crystal orientation agent. Meanwhile, with the method (ii), a reaction solution containing polyimide is obtained. This reaction solution may be provided as is for the preparation of the liquid crystal orientation agent, may be provided for preparation of the liquid crystal orientation agent after removing the dehydrating agent and dehydrative cyclization catalyst from the reaction solution, may be provided for preparation of the liquid crystal orientation agent after isolating the polyimide, or may be provided for preparation of the liquid crystal orientation agent after purifying the isolated polyimide. In order to remove the dehydrating agent and the dehydrative cyclization catalyst from the reaction solution, it is possible to use a method such as solvent displacement, for example.

C) Other Components of Alignment Film

The alignment film may contain other components in addition to the first component and the second component. Examples of other components include those originating in arbitrary components within the liquid crystal orientation agent to be described later.

<Liquid Crystal Orientation Agent>

The liquid crystal orientation agent, which is a material for the alignment film, as described above contains a polymer in which at least two types of liquid crystal orientation side chains are bonded to the polysiloxane main chain (first component), and polyamic acid and/or polyimide (second component), but may also contain other arbitrary components as necessary, and it is preferable that the liquid crystal orientation agent be prepared as a solution composition in which the respective components are dissolved in an organic solvent.

Examples of the other arbitrary components include a crosslinking agent (curing agent), a curing catalyst, a polymer other than the first component and the second component, a compound having at least one oxiranyl group in the molecule, a functional silane compound, a surfactant, or the like.

The curing agent and the curing agent can be contained in the liquid crystal orientation agent in order to strengthen to the greatest degree possible the crosslink of the first component, and to strengthen to the greatest degree possible the liquid crystal alignment film. If the liquid crystal orientation agent contains the curing agent, then it may additionally have a curing accelerator.

As the curing agent, a curing agent generally used to cure a curable composition containing a compound having a curable compound that has an epoxy group or a compound that has an epoxy group can be used. Examples of such a curing agent include a polyvalent amine, a polyvalent carboxylic anhydride, a polyvalent carboxylic acid, a polyvalent carboxylic ester, and the like. Specific examples of polyvalent carboxylic acid include cyclohexane-1,2,4-tricarboxylic acid; cyclohexane-1,3,5-tricarboxylic acid; cyclohexane-1,2,3-tricarboxylic acid; benzene-1,2,4-tricarboxylic acid; naphthalene-1,2,4-tricarboxylic acid; and the like. Examples of a cyclohexane tricarboxylic anhydride include cyclohexane-1,3,4-tricarboxylic acid-3,4-anhydride; cyclohexane-1,3,5-tricarboxylic acid-3,5-anhydride; cyclohexane-1,2,3-tricarboxylic acid-2,3-acid anhydride; 4-methyltetrahydrophthalic anhydride; methyl nadic anhydride; dodecenylsuccinic anhydride; and the like.

The polymers aside from the first component and the second component can be used in order to improve the solubility characteristics of the liquid crystal orientation agent and the electrical characteristics of the obtained liquid crystal alignment film.

The compound having at least one oxiranyl group in the molecule can be contained in the liquid crystal orientation agent in order to improve the adhesiveness of the formed alignment film on the surface of the substrate.

The functional silane compound can be used in order to improve the adhesiveness between the obtained liquid crystal alignment film and the substrate.

It is preferable that the organic solvent that can be used to prepare the liquid crystal orientation agent dissolve the first component, the second component, and other arbitrary components that are arbitrarily used, and that the organic solvent not react therewith. One of such organic solvents can be used, or two or more thereof can be combined. A preferable example of the organic solvent is a mixed solvent containing solvents such as γ-butyl lactone (BL), N-methylpyrrolidone (NMP), Butyl Cellusolve (BC), diethyl ether dibutyl glycol (DEDG), dipentyl ether (DPE), and the like.

The solid content concentration of the liquid crystal orientation agent, that is, the weight of all components in the liquid crystal orientation agent other than the solvent in relation to the total weight of the liquid crystal orientation agent is selected according to viscosity, volatility, and the like, and it is preferable that the solid content concentration be 1-10 wt %. The liquid crystal orientation agent is coated on the substrate surface and forms a coated film to be the alignment film, but if the solid content concentration is less than 1 wt %, then this sometimes results in the coated film being too thin, making it difficult to attain an excellent alignment film. On the other hand, if the solid content concentration exceeds 10 wt %, then the thickness of the coated film becomes too great and it becomes difficult to attain an excellent alignment film, and in some cases, the viscosity of the liquid crystal orientation agent increases, which makes it difficult to coat the liquid crystal orientation agent. The specific preferable solid content concentration differs depending on the mode by which the liquid crystal orientation agent is coated on the substrate. In the case of the inkjet method, it is preferable that the solid content concentration be in the range of 1-5 wt % with a solution viscosity of 3-15 mPa·s. In the case of the spinner method, it is preferable that the range be 1.5-4.5 wt %. In the case of the printing method, it is preferable that the solid content concentration be in the range of 3-9 wt % with a solution viscosity of 12-50 mPa·s.

<Method of Forming Alignment Film>

The liquid crystal display panel of the present embodiment is provided with alignment films formed from such liquid crystal orientation agents. The alignment film can be formed from the liquid crystal orientation agent by coating the liquid crystal orientation agent on the substrate, heating the liquid crystal orientation agent to form a coated film, and then radiating light on the coated film to perform alignment treatment. Methods of coating the liquid crystal orientation agent include the roll coater method, the spinner method, the printing method, the inkjet method, and the like. Heating may be performed in two stages with a prebaking stage and a postbaking stage. It is preferable that the thickness of the coated film be 10 nm or greater, more preferable that the thickness be 40 nm or greater, even more preferable that the thickness be 45 nm or greater, and especially preferable that the thickness be 50 nm or greater. In addition, it is preferable that the thickness be 300 nm or less, more preferable that the thickness be 150 nm or less, even more preferable that the thickness be 145 nm or less, and especially preferable that the thickness be 140 nm or less.

The light used for the alignment treatment can be linearly polarized light or non-polarized light, and can include ultraviolet and visible light rays in the wavelength range of 150 nm to 800 nm, for example, but it is preferable that the light be ultraviolet including light in the wavelength range of 250 nm to 400 nm. If linearly polarized light is to be used, this light may be radiated from a direction perpendicular to the surface of the substrate, or from a diagonal direction in order to apply a pretilt angle, or a combination thereof may be adopted. If non-polarized light is to be radiated, then the radiation direction needs to be diagonal.

The light source to be used can be a low pressure mercury lamp, a high pressure mercury lamp, a deuterium lamp, a metal halide lamp, an argon resonance lamp, a xenon lamp, an excimer laser, or the like. The ultraviolet rays in the preferable wavelength region can be attained by a method or the like by which the light source is combined with a filter, diffraction grating, or the like, for example.

It is preferable that the amount of radiation emitted be 0.1 mJ/cm$^2$ or greater and less than 1000 mJ/cm$^2$, and more preferable that the amount of radiation emitted be 1mJ/cm$^2$ or greater and less than 200 mJ/cm$^2$.

Various Modification Examples

A) VATN Mode

There is no special limitation on the display mode of the liquid crystal display device, but vertical alignment twisted nematic (VATN) mode can be used, for example. Below, a VATN mode liquid crystal display device will be described with reference to FIGS. 3 to 7.

Figure 3:
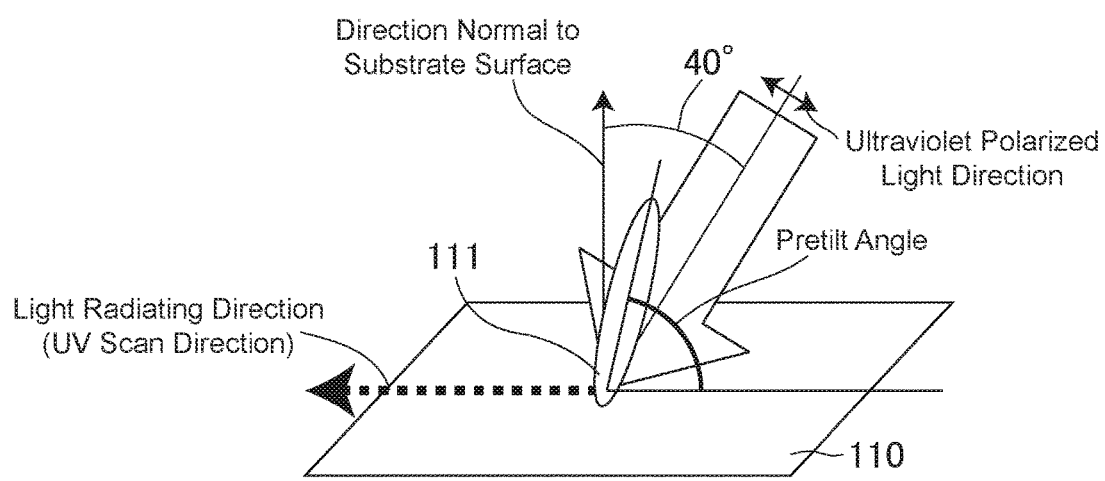
FIG. 3 is a schematic perspective view showing the relation between a photoalignment treatment direction and a pretilt direction of liquid crystal molecules in a VATN mode liquid crystal display device.
Figure 5:
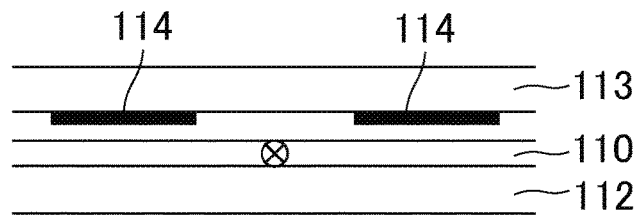
FIG. 5 is a schematic cross-sectional view showing a first arrangement relation between substrates and a photomask during a photoalignment treatment process for performing alignment division by proximity exposure using an alignment mask.
Figure 6:
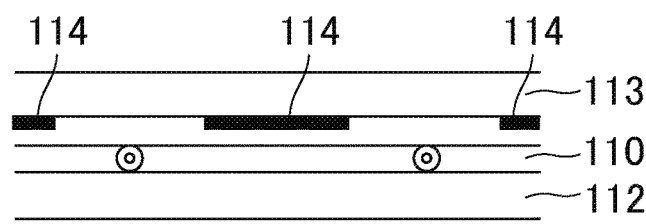
FIG. 6 is a schematic cross-sectional view showing a second arrangement relation between substrates and a photomask during a photoalignment treatment process for performing alignment division by proximity exposure using an alignment mask.

FIG. 3 is a schematic perspective view showing the relation between the photoalignment treatment direction and the pretilt direction of the liquid crystal molecules in a VATN mode liquid crystal display device. FIG. 4(a) is a schematic plan view showing the average liquid crystal director direction in one pixel (one pixel or one sub-pixel) and the photoalignment treatment direction with respect to a pair of substrates (upper and lower substrates) when a VATN mode liquid crystal display device is of a mono-domain type; and FIG. 4(b) is a schematic view showing the absorption axis directions of polarizing plates provided on the liquid crystal display device shown in FIG. 4(a). FIG. 4(a) shows a state in which the photoalignment treatment direction is perpendicular to the pair of substrates and in which an AC voltage at or above a threshold is applied between the pair of substrates. The solid line arrow in FIG. 4(a) indicates the light radiation direction (photoalignment treatment direction) with respect to the upper substrate, and the dotted line arrow indicates the light radiation direction (photoalignment treatment direction) with respect to the lower substrate. FIG. 5 is a schematic cross-sectional view showing a first arrangement relation between substrates and a photomask during a photoalignment treatment process for performing alignment division by proximity exposure using an alignment mask. FIG. 6 is a schematic cross-sectional view showing a second arrangement relation between substrates and a photomask during a photoalignment treatment process for performing alignment division by proximity exposure using an alignment mask. FIG. 7(a) is a schematic plan view showing the average liquid crystal director directions in one pixel (one pixel or one sub-pixel), the photoalignment treatment directions with respect to a pair of substrates (upper and lower substrates), and a domain division pattern when the liquid crystal display device is of a four-domain type; and FIG. 7(b) is a schematic view showing the absorption axis directions of polarizing plates provided on the liquid crystal display device shown in FIG. 7(a). FIG. 7(a) shows a state in which an AC voltage at or above a threshold is applied between the pair of substrates. The solid line arrows in FIG. 7(a) indicate the light radiation direction (photoalignment treatment direction) with respect to the upper substrate, and the dotted line arrows indicate the light radiation direction (photoalignment treatment direction) with respect to the lower substrate.

The VATN mode liquid crystal display device has a liquid crystal layer containing liquid crystal molecules having a negative dielectric anisotropy sandwiched between a pair of substrates (upper and lower substrates). The pair of substrates have insulating transparent substrates made of glass or the like, the surfaces of the pair of substrates in contact with the liquid crystal layer respectively have transparent electrodes, and additionally, the alignment films having vertical alignment characteristics are respectively formed on the transparent electrodes. The pair of substrates function, respectively, as a driving element substrate (TFT substrate, for example) on which a driving element (switching element) is formed for each pixel (one pixel or one sub-pixel), and a color filter substrate on which color filters are formed in correspondence with each pixel of the driving element substrate.

In a driving element substrate, the transparent electrodes connected to the driving elements and formed in a matrix function as pixel electrodes. On the color filter substrate, the transparent electrode formed uniformly over the entire surface of the display region functions as an opposite electrode (common electrode). Additionally, on the surfaces of the pair of substrates opposite to the liquid crystal layer side, polarizing plates are arranged in a crossed Nicols state, for example, and cell thickness maintaining bodies (spacers) for maintaining a uniform cell thickness are arranged in prescribed positions (non-display region). There is no special limitation on the material properties of the substrate and the transparent electrodes, the material of the liquid crystal molecules, or the like.

As shown in FIG. 3, if ultraviolet light (UV light; white arrow in FIG. 3) polarized to be parallel to the incident surface is radiated at 40° with respect to the direction normal to the substrate surface, for example, then the alignment film 110 can be provided with a pretilt angle for the liquid crystal molecules 111 towards the light radiation direction. Exposure of the alignment film 110 may be performed by one-shot exposure or scanning exposure. In other words, the alignment film 110 may be irradiated with the substrate and light source being fixed in place, or, as shown by the dotted arrow in FIG. 3, the alignment film 110 may be irradiated while scanning UV light along the light radiation direction.

Figure 4:
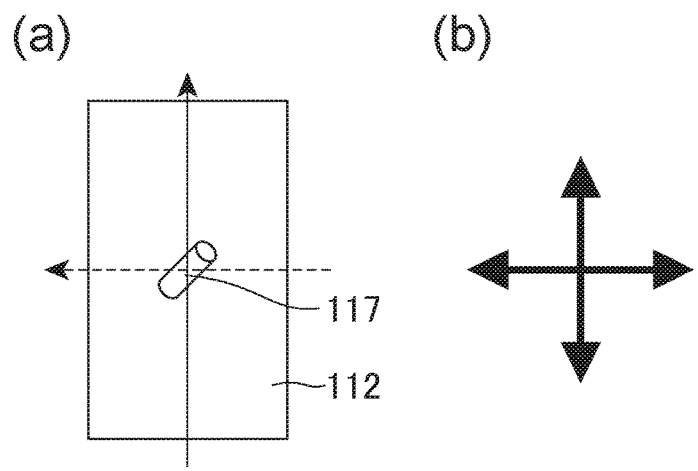
FIG. 4(a) is a schematic plan view showing the average liquid crystal director direction in one pixel (one pixel or one sub-pixel) and the photoalignment treatment direction with respect to a pair of substrates (upper and lower substrates) when a VATN mode liquid crystal display device is of a mono-domain type.
FIG. 4(b) is a schematic view showing the absorption axis directions of polarizing plates provided on the liquid crystal display device shown in FIG. 4(a).

As shown in FIG. 4(a), exposure of the alignment films and the bonding of the substrates are performed such that the light radiation directions on the pair of substrates (upper and lower substrates 112) are substantially perpendicular to each other when the substrates are viewed in a plan view. The pretilt angles of the liquid crystal molecules in the vicinity of the alignment films provided respectively on the upper and lower substrates 112 are substantially the same. A liquid crystal material that does not include a chiral material may be injected into the liquid crystal layer. In this configuration, if an AC voltage at or greater than a threshold is applied between the upper and lower substrates 112, the liquid crystal molecules have a structure of being twisted 90° in the direction normal to the substrate surfaces between the upper and lower substrates 112, and as shown in FIG. 4, the average liquid crystal director direction 117 during application of the AC voltage bisects the light radiation directions of the upper and lower substrates 112 when viewing the substrate in a plan view. Also, as shown in FIG. 4(b), the absorption axis direction of the polarizing plate (upper polarizing plate) disposed on the upper substrate matches the photoalignment treatment of the upper substrate, and the absorption axis direction of the polarizing plate (lower polarizing plate) disposed on the lower substrate matches the photoalignment treatment of the lower substrate.

Figure 7:
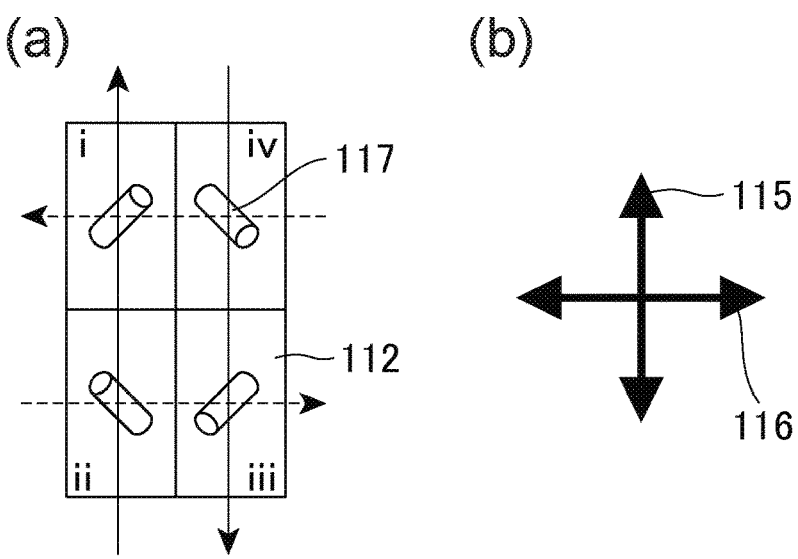
FIG. 7(a) is a schematic plan view showing the average liquid crystal director directions in one pixel (one pixel or one sub-pixel), the photoalignment treatment directions with respect to a pair of substrates (upper and lower substrates), and a domain division pattern when the liquid crystal display device is of a four-domain type.
FIG. 7(b) is a schematic view showing the absorption axis directions of polarizing plates provided on the liquid crystal display device shown in FIG. 7(a).

Next, as shown in FIG. 7, a case will be described in which the respective pixels in the liquid crystal display device have undergone alignment division. In the exposure step for forming four domains in the liquid crystal display device, first, as shown in FIG. 5, a photomask 113 having a light-shielding portion 114 having a size enabling bisection of one pixel of the liquid crystal display device in the width direction is used to expose the region corresponding to half of the one pixel in one direction (direction from front to rear of the page in FIG. 5), and the remaining half region is shielded by the light-shielding portion 114. In the next step, as shown in FIG. 6, the photomask 113 is shifted by a half-pitch of the pixel, the exposed region is shielded by the light-shielding portion 114, and the portion that is not shielded (non-exposed region that has not been exposed in the step shown in FIG. 5) is exposed in the direction opposite to that of FIG. 5 (direction from rear of page to front of page in FIG. 6). In this manner, regions that express the liquid crystal pretilts in opposite directions are formed in stripes such that the width of each pixel in the liquid crystal display device is bisected.

As described above, alignment division of each pixel on the respective substrates is performed at equal pitch so as to bisect each pixel. The substrates are arranged (bonded) such that the division directions (photoalignment treatment directions) are perpendicular to each other between the upper and lower substrates 112, and a liquid crystal material that does not contain a chiral material is injected into the liquid crystal layer. In this manner, as shown in FIG. 7(a), four domains can be formed in which the orientation directions of the liquid crystal molecules in the vicinity of the center in the thickness direction of the liquid crystal layer differ in four regions (i-iv in FIG. 7(a)), and more specifically are substantially perpendicular to each other. In other words, as shown in FIG. 7(a), the average liquid crystal director direction 117 during AC voltage application in each domain bisects the light radiation directions of the upper and lower substrates 112 when the substrates are viewed in a plan view. Also, as shown in FIG. 7(b), when the substrates are viewed in a plan view, the photoalignment treatment directions (solid line arrows in FIG. 7(a)) of the upper substrate (color filter substrate) is the same as the absorption axis direction 115 of the polarizing plate disposed on the upper substrate, and the photoalignment treatment directions (dotted line arrow in FIG. 7(a)) of the lower substrate (driving element substrate) are the same as the absorption axis direction 116 of the polarizing plate disposed on the lower substrate.

In the respective domain boundaries, the orientation direction of the liquid crystal molecules on one substrate matches the absorption axis direction of the polarizing plate, and the orientation direction of the liquid crystal molecules on the other substrate is substantially perpendicular to the substrate. Thus, if the polarizing plates are arranged in a crossed Nicols state, then light does not pass through the domain boundaries even when a voltage is applied between the substrates, causing the domain boundaries to appear as dark lines.

As described above, in the VATN mode liquid crystal display device, if four domains are formed in which the orientation directions of the liquid crystal molecules differ (are substantially perpendicular to each other), excellent viewing angle characteristics, that is, a wide viewing angle can be attained.

The layout of the domains in the VATN mode liquid crystal display device is not limited to the four domains as shown in FIG. 7(a) and may have the form shown in FIG. 8(a). FIG. 8(a) is a schematic plan view showing the average liquid crystal director directions in one pixel (one pixel or one sub-pixel), the photoalignment treatment directions with respect to a pair of substrates (upper and lower substrates), and a domain division pattern when the liquid crystal display device is of a four-domain type; FIG. 8(b) is a schematic view showing the absorption axis directions of polarizing plates provided on the liquid crystal display device shown in FIG. 8(a); and FIG. 8(c) is a schematic cross-sectional view along the line A-B of FIG. 8(a) when an AC voltage at or above a threshold is applied between the pair of substrates, and shows the orientation directions of the liquid crystal molecules. The dotted line arrows in FIG. 8(a) indicate the light radiation directions (photoalignment treatment directions) with respect to the lower substrate, and the solid line arrows indicate the light radiation directions (photoalignment treatment directions) with respect to the upper substrate. In FIG. 8(c), the dotted lines indicate domain boundaries.

Figure 8:
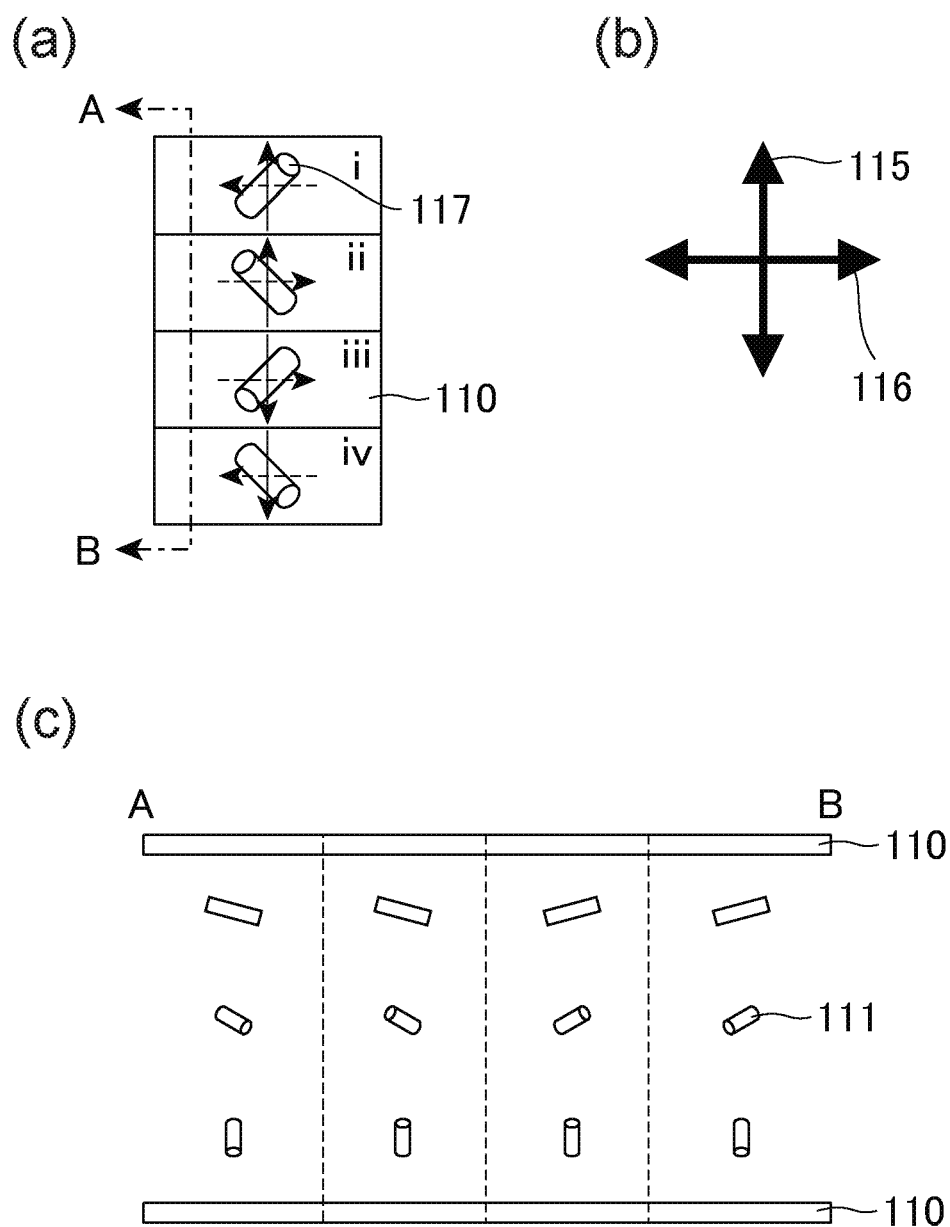
FIG. 8(a) is a schematic plan view showing the average liquid crystal director directions in one pixel (one pixel or one sub-pixel), the photoalignment treatment directions with respect to a pair of substrates (upper and lower substrates), and a domain division pattern when the liquid crystal display device is of a four-domain type.
FIG. 8(b) is a schematic view showing the absorption axis directions of polarizing plates provided on the liquid crystal display device shown in FIG. 8(a)
FIG. 8(c) is a schematic cross-sectional view along the line A-B of FIG. 8(a) when an AC voltage at or above a threshold is applied between the pair of substrates, and shows the orientation directions of the liquid crystal molecules.

In order to form the configuration of FIG. 8, first, as shown in FIG. 8(a), alignment division is performed at equal pitch to bisect each pixel on the respective substrates. The substrates are arranged (bonded) such that the division directions (photoalignment treatment directions) of the upper and lower substrates 112 are perpendicular to each other when the substrates are viewed in a plan view, and thus, as shown in FIG. 8(a), four domains can be formed in which the orientation directions of the liquid crystal molecules located towards the center of the liquid crystal layer in the thickness direction thereof differ from each other in the four regions (i-iv in FIG. 8(a)), and more specifically, are substantially perpendicular to each other. In other words, as shown in FIG. 8(a), the average liquid crystal director direction 117 during AC voltage application in each domain bisects the light radiation directions of the upper and lower substrates 112 when the substrates are viewed in a plan view. Also, as shown in FIG. 8(b), in this configuration, when the substrates are viewed in a plan view, the photoalignment treatment directions (solid line arrows in FIG. 8(a)) of the upper substrate (color filter substrate) are the same as the absorption axis direction 115 of the polarizing plate disposed on the upper substrate, and the photoalignment treatment directions (dotted line arrows in FIG. 8(a)) of the lower substrate (driving element substrate) are the same as the absorption axis direction 116 of the polarizing plate disposed on the lower substrate. When no voltage is being applied between the upper and lower substrates, the liquid crystal molecules are oriented in a direction substantially perpendicular to the upper and lower substrates by the orientation control force of the alignment films. On the other hand, when a voltage at or above a threshold is applied between the upper and lower substrates, as shown in FIG. 8(c), the liquid crystal molecules 111 shift by approximately 90° between the upper and lower substrates, and four differing alignment states are present, respectively, in the four domains.

B) Polymer Sustained Alignment (PSA) Technique

The PSA technique may be applied to the liquid crystal display device. Below, a liquid crystal display device to which the PSA technique has been applied will be described.

Figure 9:
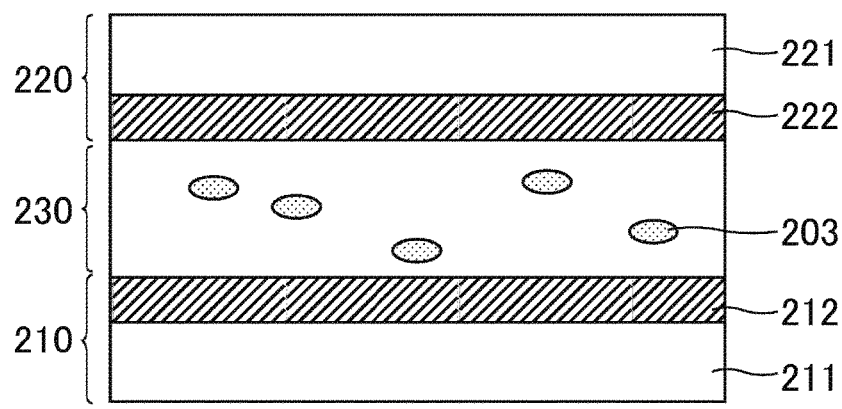
FIG. 9 is a schematic cross-sectional view of a liquid crystal display device to which the PSA technique has been applied, and shows a state prior to the PS polymerization step.
Figure 10:
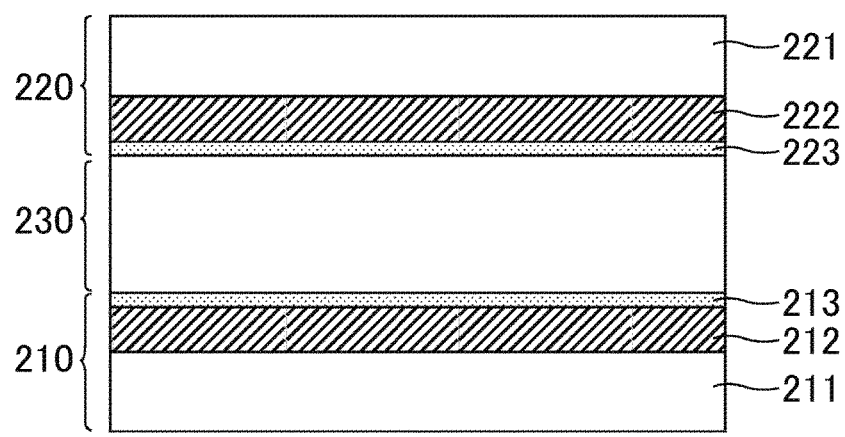
FIG. 10 is a schematic cross-sectional view of a liquid crystal display device to which the PSA technique has been applied, and shows a state after the PS polymerization step.

FIGS. 9 and 10 are schematic cross-sectional views of a liquid crystal display device to which the PSA technique has been applied. FIG. 9 shows a state prior to a polymerization step and FIG. 10 shows a state after the polymerization step. As shown in FIGS. 9 and 10, the liquid crystal display device includes an array substrate 210, a color filter substrate 220, and a liquid crystal layer 230 sandwiched between the pair of substrates including the array substrate 210 and the color filter substrate 220. The array substrate 210 has an insulating transparent substrate 211 made of a material such as glass, and additionally has respectively wiring lines, pixel electrodes, TFTs, and the like formed on the transparent substrate 211. The color filter substrate 220 has an insulating transparent substrate 221 made of a material such as glass, and also includes color filters, a black matrix, a common electrode, and the like formed on the transparent substrate 221. In the case of TN mode, STN mode, a mode using ferroelectric liquid crystal, or VA mode, the array substrate 210 and the color filter substrate 220 are provided with the pixel electrodes and the common electrode, respectively. In the case of IPS or FFS mode, electrodes are provided only on the array substrate 210.

Figure 11:
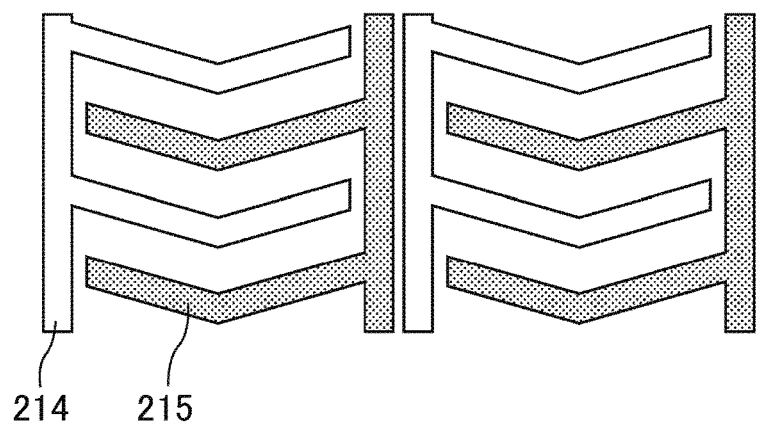
FIG. 11 is a schematic plan view of an electrode arrangement in the liquid crystal display device for when IPS mode is adopted.
Figure 12:
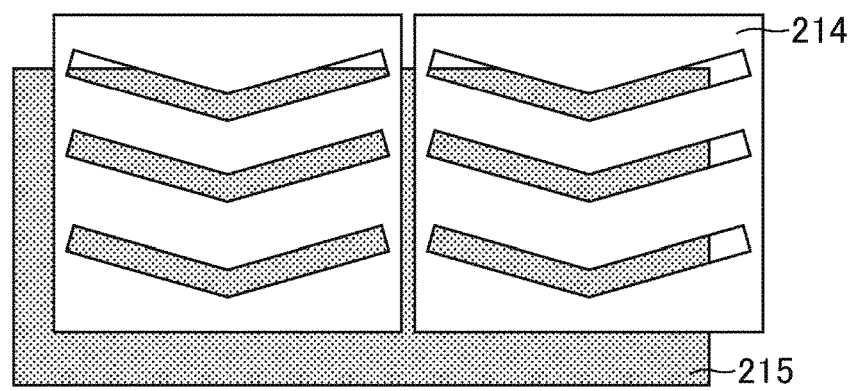
FIG. 12 is a schematic plan view of an electrode arrangement in the liquid crystal display device for when FFS mode is adopted.

FIGS. 11 and 12 are schematic plan views showing the electrode arrangement in the liquid crystal display device; FIG. 11 shows a case where IPS mode is adopted, and FIG. 12 shows a case where FFS mode is adopted. In the case of IPS mode, the pixel electrodes 214 and the common electrodes 215 are formed of pairs of comb electrodes, and are arranged such that the teeth thereof mesh with each other in the same layer. In the case of FFS mode, either the pixel electrode 214 or the common electrode 215 is made of a comb electrode or an electrode with a slit, with the other being a planar electrode. The pixel electrode 214 and common electrode 215 are arranged in differing layers with an insulating film therebetween. The pixel electrode 214 and the common electrode 215 are transparent electrodes. The array substrate 210 includes an alignment film 212 (base film), and the color filter substrate 220 also includes an alignment film 222 (base film).

As shown in FIG. 9, a polymerizable monomer 203 is present in the liquid crystal layer 230 prior to the PS polymerization step. Polymerization of the polymerizable monomer 203 starts during the PS polymerization step, and as shown in FIG. 10, PS layers 213 and 223 are formed as a result on the alignment films 212 and 222, thereby improving the orientation control force of the alignment films 212 and 222. A plurality of types of polymerizable monomers 203 may be mixed together.

The PS layer 213 and 223 can be formed by injecting a liquid crystal composition, including a liquid crystal material and a polymerizable monomer, between the array substrate 210 and the color filter substrate 220, irradiating with a certain amount of light or heating the liquid crystal layer 230, and polymerizing the polymerizable monomer 203. At this time, if an orientation force in an azimuth direction is applied in advance by performing light radiation or the like on the surface of the alignment films, then polymerization can be performed without applying a voltage to the liquid crystal layer 230. If no orientation force in the azimuth direction is applied to the surfaces of the alignment films, then by performing polymerization while applying a voltage at or above a threshold on the liquid crystal layer 230, the PS layers 213 and 223 are formed so as to have a shape along the initial inclination of the liquid crystal molecules. In addition, even if an orientation force in the azimuth direction has been applied in advance, by additionally performing polymerization with a voltage at or above a threshold being applied, PS layers 213 and 223 having a more stable alignment stability can be attained. A polymerization initiator may be added as necessary to the liquid crystal composition.

Examples of polymerizable monomers 203 that can be used include monomers that have a monofunctional or multifunctional polymerizable group having one or more ring structures. An example of such a monomer is the compound represented in chemical formula (14) below.

<Chemical Formula 7>

(14)

In formula (14), n is 0, 1, or 2. $P^1$ represents a polymerizable group. $Sp^1$ represents an alkylene group or alkyleneoxy group having a straight chain, a branched chain, or ring shape with a carbon number of 1 to 6, or a direct bond. $R^1$ represents a —$R^2$-$Sp^1$-$P^1$ group, a hydrogen atom, a halogen atom, a —CN group, a —$NO_2$ group, a —NCO group, a —NCS group, a —OCN group, a —SCN group, a —$SF_5$ group, or an alkyl group having a straight chain or a branched chain with a carbon number of 1 to 12. The hydrogen atom in $R^1$ may be substituted with a fluorine atom or a chlorine atom.

As long as an oxygen atom and a sulfur atom are not adjacent to each other, the —$CH_2$— group in $R^1$ may be substituted with a —O— group, a —S— group, a —NH— group, a —CO— group, a —COO— group, a —OCO— group, a —O—COO— group, a —$OCH_2$— group, a —$CH_2O$— group, a —$SCH_2$— group, a —$CH_2S$— group, a —$N(CH_3)$— group, a —$N(C_2H_5)$— group, a —$N(C_3H_7)$— group, a —$N(C_4H_9)$— group, a —$CF_2O$— group, a —$OCF_2$— group, a —$CF_2S$— group, a —$SCF_2$— group, —$N(CF_3)$— group, a —$CH_2CH_2$— group, a —$CF_2CH_2$— group, a —$CH_2CF_2$— group, a —$CF_2CF_2$— group, a —CH=CH— group, a —CF=CF— group, a —C≡C— group, a —CH=CH—COO— group, or a —OCO—CH=CH— group.

$R^2$ represents a —O— group, a —S— group, a —NH— group, a —CO— group, a —COO— group, a —OCO— group, a —O—COO— group, a —$OCH_2$— group, a —$CH_2O$— group, a —$SCH_2$— group, a —$CH_2S$— group, a —$N(CH_3)$— group, a —$N(C_2H_5)$— group, a —$N(C_3H_7)$— group, a —$N(C_4H_9)$— group, a —$CF_2O$— group, a —$OCF_2$— group, a —$CF_2S$— group, a —$SCF_2$— group, —$N(CF_3)$— group, a —$CH_2CH_2$— group, a —$CF_2CH_2$— group, a —$CH_2CF_2$— group, a —$CF_2CF_2$— group, a —CH=CH— group, a —CF=CF— group, a —C≡C— group, a —CH=CH—COO— group, a —OCO—CH=CH— group, or a direct bond.

$A^1$ and $A^2$ are the same or different from each other, and represent a 1,2-phenylene group, a 1,3-phenylene group, a 1,4-phenylene group, a naphthalene-1,4-diyl group, a naphthalene-1,5-diyl group, a naphthalene-2,6-diyl group, a 1,4-cyclohexylene group, a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, a 1,2,3,4-tetrahydronaphthalene-2,6-diyl group, an indane-1,3-diyl group, an indane-1,5-diyl group, an indane-2,5-diyl group, a phenanthrene-1,6-diyl group, a phenanthrene-1,8-diyl group, a phenanthrene-2,7-diyl group, a phenanthrene-3,6-diyl group, an anthracene-1,5-diyl group, an anthracene-1,8-diyl group, an anthracene-2,6-diyl group, or an anthracene-2,7 diyl group.

The —$CH_2$— group of $A^1$ and $A^2$ may be substituted with a —O— group or a —S— group as long as they are not adjacent to each other. The hydrogen atom in $A^1$ and $A^2$ may be substituted with a fluorine atom, a chlorine atom, or a —CN group; or with an alkyl group, an alkoxyl group, an alkyl-carbonyl group, an alkoxycarbonyl group, or an alkylcarbonyloxy group having a carbon number of 1 to 6.

Z is the same or different and represents an —O— group, a —S— group, a —NH— group, a —CO— group, a —COO— group, a —OCO— group, a —O—COO— group, a —$OCH_2$— group, a —$CH_2O$— group, a —$SCH_2$— group, a —$CH_2S$— group, a —$N(CH_3)$— group, a —$N(C_2H_5)$— group, a —$N(C_3H_7)$— group, a —$N(C_4H_9)$— group, a —$CF_2O$— group, a —$OCF_2$— group, a —$CF_2S$— group, a —$SCF_2$— group, —$N(CF_3)$— group, a —$CH_2CH_2$— group, a —$CF_2CH_2$— group, a —$CH_2CF_2$— group, a —$CF_2CF_2$— group, a —CH=CH— group, a —CF=CF— group, a —C≡C— group, a —CH=CH—COO— group, a —OCO—CH=CH— group, or a direct bond.

Specific examples of the compound represented in chemical formula (14) include any of the compounds represented in chemical formulae (15) to (19) below.

<Chemical Formula 8>

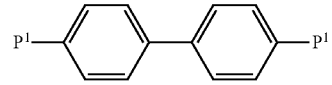

(15)

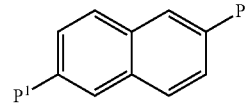

(16)

-continued

(17)
(18)
(19)

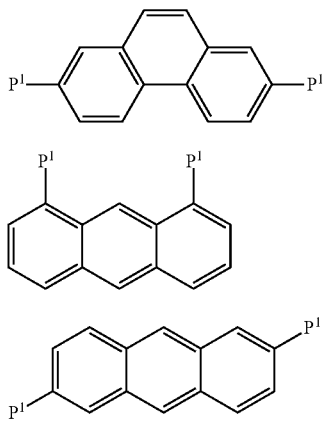

In formulae (15) to (19), $P^1$ is the same or different and represents a polymerizable group. Some or all of the hydrogen atoms in the benzene ring may be substituted with a halogen atom, or an alkyl group or alkoxy group having a carbon number of 1 to 12. Some or all of the hydrogen atoms in the alkyl group or alkoxy group having a carbon number of 1 to 12 may be substituted with a halogen atom.

Examples of $P^1$ are an acryloyloxy group, a methacryloyloxy group, a vinyl group, a vinyloxy group, an acryloylamino group, or a methacryloylamino group.

The compounds represented in chemical formulae (15)-(19) are monomers that undergo photofragmentation by being irradiated with ultraviolet rays and generate radicals, and thus, can be polymerized without a polymerization initiator, thereby preventing a decrease in display quality due to screen burn-in or the like resulting from polymerization initiators and the like remaining even after the PS step has been completed.

Specific examples of the other polymerizable monomers 203 that can be used include any of the compounds represented in chemical formulae (20) to (27) below.

<Chemical Formula 9>

(20)

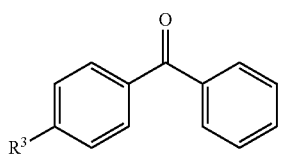

(21)

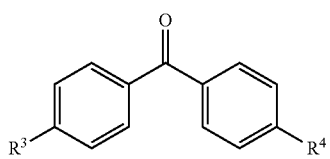

(22)

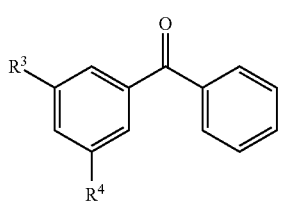

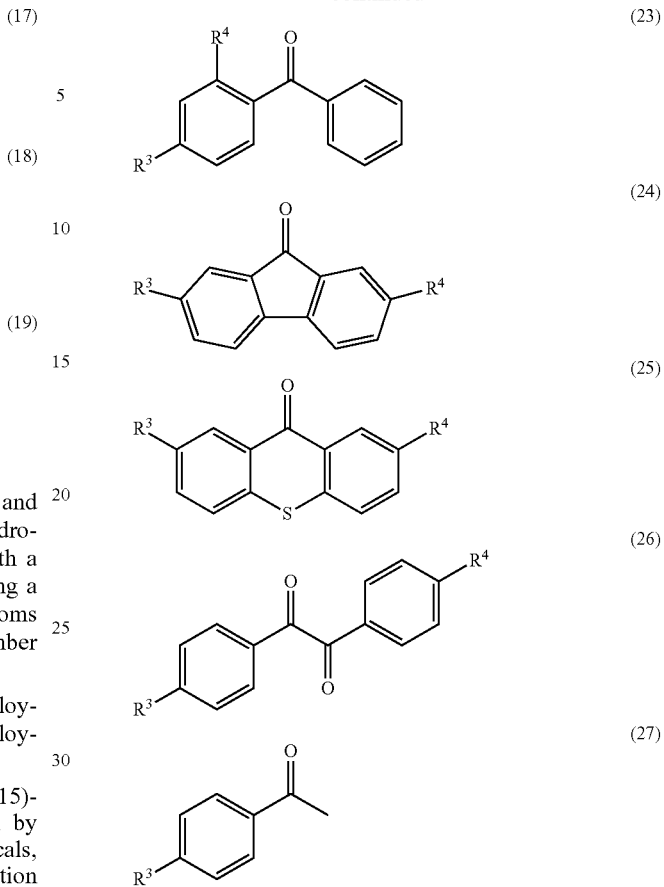

(23)

(24)

(25)

(26)

(27)

In formulae (20) to (27) above, $R^3$ and $R^4$ are either the same or different and represent a -$Sp^2$-$P^2$ group, a hydrogen atom, a halogen atom, a —CN group, a —$NO_2$ group, a —NCO group, a —NCS group, a —OCN group, a —SCN group, a —$SF_5$ group, or an alkyl group, an aralkyl group, or a phenyl group having a carbon number of 1 to 12 and a straight chain or a branched chain.

At least one of $R^3$ and $R^4$ includes a -$Sp^2$-$P^2$ group. $P^2$ represents a polymerizable group. An example of $P^2$ is an acryloyloxy group, a methacryloyloxy group, a vinyl group, a vinyloxy group, an acryloylamino group, or a methacryloylamino group. $Sp^2$ represents an alkylene group or alkyleneoxy group having a straight chain, a branched chain, or ring shape with a carbon number of 1 to 6, or a direct bond.

If at least one of $R^3$ and $R^4$ is an alkyl group, an aralkyl group, or a phenyl group having a carbon number of 1 to 12 and a straight chain or a branched chain, then the hydrogen atom of at least one of $R^3$ and $R^4$ may be replaced by a fluorine atom, a chlorine atom, or a -$Sp^2$-$P^2$ group.

As long as an oxygen atom, a sulfur atom, and a nitrogen atom are not adjacent to each other, the —$CH_2$— group in $R^3$ and $R^4$ may be substituted with a —O— group, a —S— group, a —NH— group, a —CO— group, a —COO— group, a —OCO— group, a —O—COO— group, a —$OCH_2$— group, a —$CH_2O$— group, a —$SCH_2$— group, a —$CH_2S$— group, a —$N(CH_3)$— group, a —$N(C_2H_5)$— group, a —$N(C_3H_7)$— group, a —$N(C_4H_9)$— group, a —$CF_2O$— group, a —$OCF_2$— group, a —$CF_2S$— group, a —$SCF_2$— group, a —$N(CF_3)$— group, a —$CH_2CH_2$— group, a —$CF_2CH_2$— group, a —$CH_2CF_2$— group, a —$CF_2CF_2$— group, a —CH=CH— group, a —CF=CF— group, a —C≡C— group, a —CH═CH—COO— group, or a —OCO—CH═CH— group.

Some or all of the hydrogen atoms in the benzene ring in $R^3$ and $R^4$ may be substituted with a halogen atom, or an alkyl group or alkoxy group having a carbon number of 1 to 12. Some or all of the hydrogen atoms in the alkyl group or alkoxy group having a carbon number of 1 to 12 may be substituted with a halogen atom.

The compounds represented in chemical formulae (20)-(27) are compounds from which hydrogen is pulled by being irradiated with visible light and generate radicals, and thus, can be polymerized without a polymerization initiator, thereby preventing a decrease in display quality due to screen burn-in or the like resulting from polymerization initiators remaining even after the PS step has been completed.

It is preferable that the radiation of ultraviolet light for PS processing be performed from whichever substrate does not have color filters. If ultraviolet light is radiated from the substrate having color filters, the color filters absorb the ultraviolet light.

By adding a functional group having a mulendle bond such as an alkenyl group into the molecular structure of the liquid crystal material, the PS chemical reaction is encouraged, thereby mitigating burn-in. Specifically, a liquid crystal material having a mulendle bond other than a conjugated double bond of a benzene ring in the molecular structure is well-suited.

An example of such liquid crystal molecules has a structure that includes as the core portion a structure in which two ring structures of at least one type selected from a benzene ring, cyclohexylene, and cyclohexene are linked at para positions by a direct bond or a linking group, with at least one type selected from among a hydrocarbon group with a carbon number of 1 to 30 and a cyano group being bonded to both sides (para positions) of the core portion. The core portion may have a substituent group or an unsaturated bond. Specific examples include compounds represented in chemical formulae (28) to (32) below. A suitable liquid crystal material contains a plurality of such liquid crystal molecules.

<Chemical Formula 10>

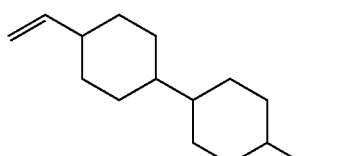

(28)

<Chemical Formula 11>

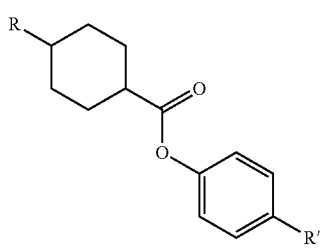

(29)

<Chemical Formula 12>

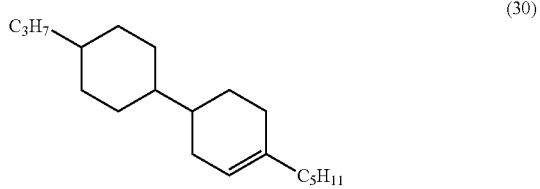

(30)

<Chemical Formula 13>

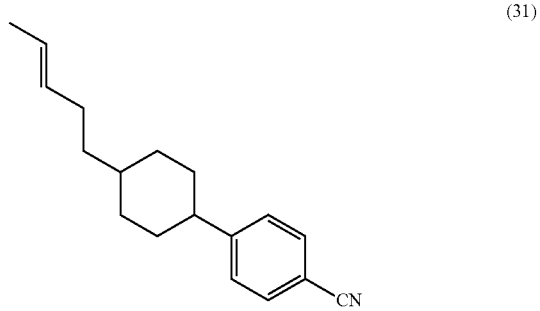

(31)

<Chemical Formula 14>

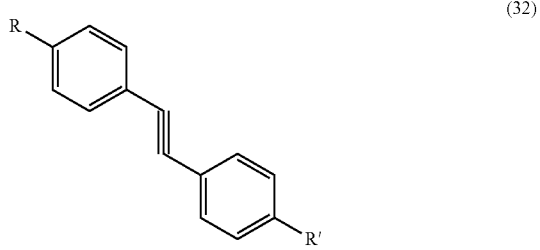

(32)

R and R' in chemical formulae (29) and (32) are the same or different and represent a hydrocarbon group having a carbon number of 1 to 30. The hydrocarbon group may have a substituent group or an unsaturated bond.

An embodiment of the present invention was described above, but individual items disclosed as explanations for the embodiment are all for explaining a preferable aspect of the present invention as a whole, and the individual items are not limited to the one aspect of the present invention disclosed in the drawings.

Below, the present invention will be described in further detail with liquid crystal orientation agent synthesis examples and working examples, but the present invention is not limited to these synthesis examples and working examples.

1. Preparing Liquid Crystal Orientation Agent

Synthesis Example 1

In the polymer that is the first component of the liquid crystal orientation agent, the first side chain having on the end thereof a fluorine atom and the second side chain that does not have on the end thereof a fluorine atom were bonded as liquid crystal orientation side chains to the reactive polysiloxane.

For the reactive polysiloxane (polysiloxane prior to the liquid crystal orientation side chains being bonded thereto), a compound in formula (1) below was used in which X is a 2-(3,4-epoxycyclohexyl)ethyl group, and Y is a methoxy group.

<Chemical Formula 15>

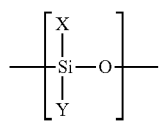
(1)

For the first side chain, a group represented in the following formula (33) including a photofunctional group was used. The amount of the first side chain introduced was 0.3 mol in relation to 1 mol of silicon atoms belonging to the siloxane main chain (reactive polysiloxane). For the second side chain, a group represented in the following formula (34) including a photofunctional group was used. The amount of the second side chain introduced was 0.2 mol in relation to 1 mol of silicon atoms belonging to the siloxane main chain (reactive polysiloxane). As can be seen from the introduced amounts above, at least a portion of X and Y in formula (1) remained in the polymer.

<Chemical Formula 16>

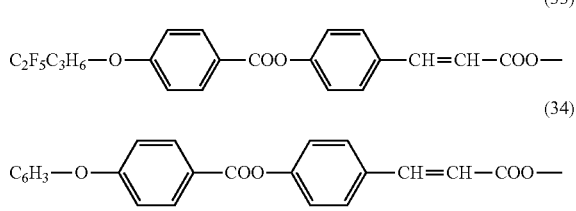

(33)

(34)

For the second component of the liquid crystal orientation agent, polyamic acid (1) was used, the polyamic acid being a reactant of a 1,2,3,4-cyclobutanetetracarboxylic dianhydride as the acid anhydride, and 4,4'-diaminodiphenyl ether as the diamine.

The liquid crystal orientation agent of Synthesis Example 1 was prepared by dissolving in a solvent a solid component constituted of the first component and the second component. In the solid component, where the weight of the second component (polyamic acid) was 100, the weight of the first component (polymer) was 15. That is, the denaturation ratio of the alignment film was adjusted to be 15 wt %. For the solvent, a mixed solvent was used in which NMP (N-methylpyrrolidone) and BC (ethylene glycol monobutyl ether, Butyl Cellosolve) were mixed at a weight ratio of 1:1. The concentration of the solid component was set at 3.0 wt %.

In this manner, the liquid crystal orientation agent of Synthesis Example 1 was prepared. This liquid crystal orientation agent was a material for a vertical alignment film and could be applied to photoalignment treatment.

Synthesis Example 2

The present synthesis example was the same as Synthesis Example 1 other than the amount introduced of the first side chain and the amount introduced of the second side chain in the polymer that is the first component of the liquid crystal orientation agent, and the type of polyamic acid that is the second component of the liquid crystal orientation agent.

In the polymer that is the first component of the liquid crystal orientation agent, the amount introduced of the first side chain was set to 0.1 mol in relation to the 1 mol of silicon atoms belonging to the siloxane main chain (reactive polysiloxane), and the amount introduced of the second side chain was set to 0.4 mol in relation to the 1 mol of silicon atoms belonging to the siloxane main chain (reactive polysiloxane).

For the second component of the liquid crystal orientation agent, a polyamic acid (2) was used, the polyamic acid being a reactant between 2,3,5-tricarboxy cyclopentyl acetic acid dianhydride as the acid anhydride, and p-phenylenediamine (90 mol %) as the diamine and the compound represented in formula (35) below (10 mol %).

<Chemical Formula 18>

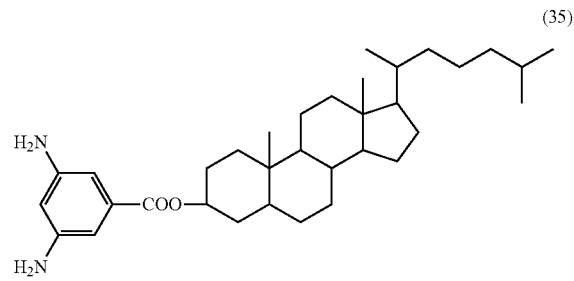
(35)

This liquid crystal orientation agent of Synthesis Example 2 obtained in this manner was a material for a vertical alignment film and could be applied to photoalignment treatment.

Synthesis Example 3

The present synthesis example was the same as Synthesis Example 2 other than the amount introduced of the first side chain and the amount introduced of the second side chain in the polymer that is the first component of the liquid crystal orientation agent.

In the polymer that is the first component of the liquid crystal orientation agent, the amount introduced of the first side chain was set to 0.15 mol in relation to the 1 mol of silicon atoms belonging to the siloxane main chain (reactive polysiloxane), and the amount introduced of the second side chain was set to 0.35 mol in relation to the 1 mol of silicon atoms belonging to the siloxane main chain (reactive polysiloxane).

This liquid crystal orientation agent of Synthesis Example 3 obtained in this manner was a material for a vertical alignment film and could be applied to photoalignment treatment.

Synthesis Example 4

The liquid crystal orientation agent of the present synthesis example has the same composition as the liquid crystal orientation agent of Synthesis Example 3 except that the present synthesis example contains a crosslinking agent. For the crosslinking agent, cyclohexane-1,2,3-tricarboxylic acid-2,3-acid anhydride was used. The amount added of the crosslinking agent (proportion by weight) was set to 20 where the weight of the polyamic acid was 100. This liquid crystal orientation agent of Synthesis Example 4 was a material for a vertical alignment film and could be applied to photoalignment treatment.

Synthesis Example 5

The present synthesis example was the same as Synthesis Example 2 other than the amount introduced of the first side chain and the amount introduced of the second side chain in the polymer that is the first component of the liquid crystal orientation agent.

In the polymer that is the first component of the liquid crystal orientation agent, the amount introduced of the first side chain was set to 0.25 mol in relation to the 1 mol of silicon atoms belonging to the siloxane main chain (reactive polysiloxane), and the amount introduced of the second side chain was set to 0.25 mol in relation to the 1 mol of silicon atoms belonging to the siloxane main chain (reactive polysiloxane).

This liquid crystal orientation agent of Synthesis Example 5 obtained in this manner was a material for a vertical alignment film and could be applied to photoalignment treatment.

Synthesis Example 6

The present synthesis example was the same as Synthesis Example 1 other than the amount introduced of the first side chain and the amount introduced of the second side chain in the polymer that is the first component of the liquid crystal orientation agent.

In the polymer that is the first component of the liquid crystal orientation agent, the amount introduced of the first side chain was set to 0.25 mol in relation to the 1 mol of silicon atoms belonging to the siloxane main chain (reactive polysiloxane), and the amount introduced of the second side chain was set to 0.15 mol in relation to the 1 mol of silicon atoms belonging to the siloxane main chain (reactive polysiloxane).

This liquid crystal orientation agent of Synthesis Example 6 obtained in this manner was a material for a vertical alignment film and could be applied to photoalignment treatment.

Synthesis Example 7

The present synthesis example was the same as Synthesis Example 1 other than the amount introduced of the first side chain in the polymer that is the first component of the liquid crystal orientation agent, and the type of polyamic acid that is the second component of the liquid crystal orientation agent.

In the polymer that is the first component of the liquid crystal orientation agent, the amount introduced of the first side chain was set to 0.25 mol in relation to the 1 mol of silicon atoms belonging to the siloxane main chain (reactive polysiloxane), and the amount introduced of the second side chain was set to 0.2 mol in relation to the 1 mol of silicon atoms belonging to the siloxane main chain (reactive polysiloxane).

For the second component of the liquid crystal orientation agent, a polyamic acid (3) was used, the polyamic acid being a reactant between 2,3,5-tricarboxy cyclopentyl acetic acid dianhydride as the acid anhydride, and p-phenylenediamine (90 mol %) as the diamine and the compound represented in formula (36) below (10 mol %).

<Chemical Formula 19>

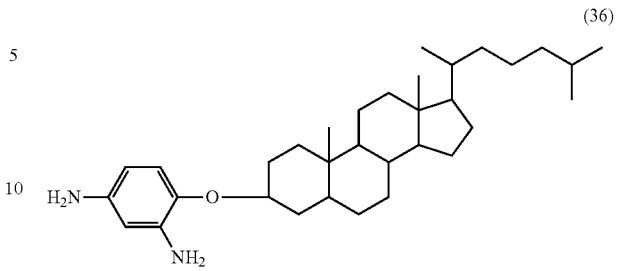

(36)

This liquid crystal orientation agent of Synthesis Example 7 obtained in this manner was a material for a vertical alignment film and could be applied to photoalignment treatment.

Synthesis Example 8

The present synthesis example was similar to Synthesis Example 5 except for the type used of polyamic acid that is the second component of the liquid crystal orientation agent.

For the second component of the liquid crystal orientation agent, a polyamic acid (4) was used, the polyamic acid being a reactant between 2,3,5-tricarboxy cyclopentyl acetic acid dianhydride as the acid anhydride, and p-phenylenediamine (90 mol %) as the diamine and the compound represented in formula (37) below (10 mol %).

<Chemical Formula 20>

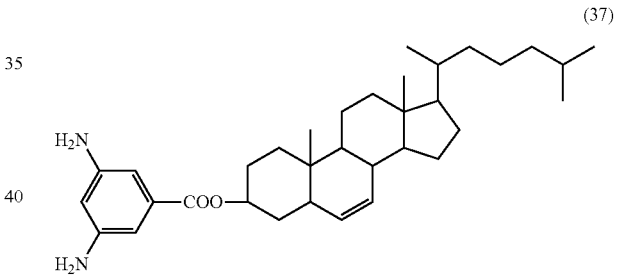

(37)

This liquid crystal orientation agent of Synthesis Example 8 obtained in this manner was a material for a vertical alignment film and could be applied to photoalignment treatment.

Synthesis Example 9

The present synthesis example was the same as Synthesis Example 5 other than the type of the first side chain in the polymer that is the first component of the liquid crystal orientation agent.

The polymer that is the first component of the liquid crystal orientation agent used the group represented in formula (38) below including a photofunctional group as the first side chain.

<Chemical Formula 21>

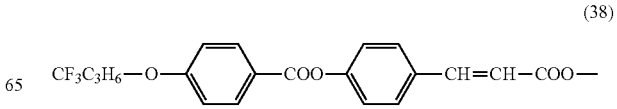

(38)

This liquid crystal orientation agent of Synthesis Example 9 obtained in this manner was a material for a vertical alignment film and could be applied to photoalignment treatment.

Synthesis Example 10

The present synthesis example was the same as Synthesis Example 5 other than the type of the first side chain in the polymer that is the first component of the liquid crystal orientation agent. In the polymer that is the first component of the liquid crystal orientation agent, the group represented in formula (39) below including the photofunctional group was used as the first side chain, and the group represented in formula (40) below including the photofunctional group was used as the second side chain.

<Chemical Formula 22>

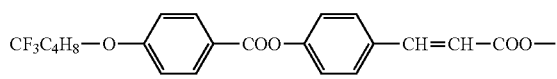
(39)

<Chemical Formula 23>

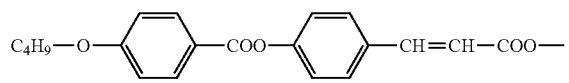
(40)

This liquid crystal orientation agent of Synthesis Example 10 obtained in this manner was a material for a vertical alignment film and could be applied to photoalignment treatment.

Comparison Synthesis Example 1

The present comparison synthesis example was the same as Synthesis Example 1 other than the side chain in the polymer that is the first component of the liquid crystal orientation agent. In the polymer that is the first component of the liquid crystal orientation agent, the same types of reactive polysiloxane and the second side chain (formula (34)) were used as Synthesis Example 1, but the first side chain was not used. Also, the amount of the second side chain introduced was 0.5 mol in relation to 1 mol of silicon atoms belonging to the siloxane main chain (reactive polysiloxane).

The liquid crystal orientation agent of Comparison Synthesis Example 1 was prepared by dissolving in a solvent a solid component constituted of the first component and the second component. In the solid component, where the weight of the second component (polyamic acid) was 100, the weight of the first component (polymer) was 15. That is, the denaturation ratio of the alignment film was adjusted to be 15 wt %. For the solvent, a mixed solvent was used in which NMP (N-methyl-pyrrolidone) and BC (ethylene glycol monobutyl ether, Butyl Cellosolve) were mixed at a weight ratio of 1:1. The concentration of the solid component was set at 3.0 wt %.

In this manner, the liquid crystal orientation agent of Comparison Synthesis Example 1 was prepared. This liquid crystal orientation agent was a material for a vertical alignment film and could be applied to photoalignment treatment.

Comparison Synthesis Example 2

The present comparison synthesis example was similar to Comparison Example 1 except for the type used of polyamic acid that is the second component of the liquid crystal orientation agent. For the second component of the liquid crystal orientation agent, the same polyamic acid (2) as Synthesis Example 2 was used. This liquid crystal orientation agent of Comparison Synthesis Example 2 obtained in this manner was a material for a vertical alignment film and could be applied to photoalignment treatment.

Comparison Synthesis Example 3

The present comparison synthesis example was the same as Synthesis Example 1 other than the side chain in the polymer that is the first component of the liquid crystal orientation agent. In the polymer that is the first component of the liquid crystal orientation agent, the same types of reactive polysiloxane and the first side chain (formula (33)) were used as Synthesis Example 1, but the second side chain was not used. In addition, the amount of the first side chain introduced was 0.5 mol in relation to 1 mol of silicon atoms belonging to the siloxane main chain (reactive polysiloxane). This liquid crystal orientation agent of Comparison Synthesis Example 3 obtained in this manner was a material for a vertical alignment film and could be applied to photoalignment treatment.

Comparison Synthesis Example 4

The present comparison synthesis example was similar to Synthesis Example 5 except that the ratio of the first component to the second component in the liquid crystal orientation agent, that is the denaturation ratio (weight of first component/weight of second component), was set to 1 wt %.

This liquid crystal orientation agent of Comparison Synthesis Example 4 obtained in this manner was a material for a vertical alignment film and could be applied to photoalignment treatment.

2. Manufacturing Liquid Crystal Display Element (1)

Working Examples 1-10 and Comparison Examples 1-4

Using the liquid crystal orientation agent of Synthesis Examples 1 to 10 and Comparison Synthesis Examples 1 to 4, the liquid crystal display elements of Working Examples 1 to 10 and Comparison Examples 1 to 4 were respectively manufactured by performing steps (1) to (6) below. The display modes of these liquid crystal display elements were all VATN mode, and the pixels were formed so as to include a plurality of domains each.

(1) A glass substrate (TFT substrate) that is 0.7 mm in thickness and has TFT elements and indium tin oxide (no) transparent electrodes was prepared, and a glass substrate (color filter substrate) that is 0.7 mm in thickness and has a black matrix, color filters, photospacers, and an ITO transparent electrode was prepared.

(2) A liquid crystal orientation agent was coated by the injection method onto the surfaces of both substrates, which have been washed, on which the transparent electrodes were to be formed. Next, the substrates were pre-dried for 2 minutes at 80° C. Then, the substrates were baked for 40 minutes at 200° C. in a nitrogen atmosphere, after which the substrates were cooled to room temperature, and a coated film was formed to a thickness of 100 nm. In primarily the baking step, the polyamic acid in the liquid crystal orientation agent was thermally imidized such that a portion thereof became a polyimide.

(3) Then, alignment treatment was performed on the surfaces of the respective substrates by radiating thereon linearly polarized ultraviolet light having a wavelength of 313 nm and an extinction ratio of 10:1 from a direction inclined by 40° with respect to a line normal to the substrate and at an energy of 20 mJ/cm$^2$, thereby attaining the alignment films. When radiating linearly polarized ultraviolet light, a photomask was used to perform alignment treatment such that each pixel was divided into four domains.

(4) A dispenser was used to draw onto one substrate an ultraviolet curable sealing agent (made by Sekisui Chemical Co. Ltd.; product name: Photolec S-WB). On a prescribed portion of the other substrate, a negative liquid crystal composition (made by Merck; product name: MLC-6610) was dripped. The pair of substrates was arranged such that the four domains were formed in each pixel, and then bonded together in a vacuum. Additionally, the sealing agent bonding together the substrates was cured in ultraviolet light.

(5) In order to eliminate flow orientation of the liquid crystal, the liquid crystal cells were heated at 130° C. for 40 minutes, realignment treatment to cause the liquid crystal to enter an isotropic phase was performed, and then, the liquid crystal was cooled down to room temperature, thereby attaining the liquid crystal cell.

(6) A pair of polarizing plates arranged in a crossed Nicols state were arranged such that the polarizing axes thereof match the radiation directions of ultraviolet light radiated on the alignment films, and as a result, manufacturing of the liquid crystal display element was completed.

Working Example 11

A liquid crystal display element of Working Example 11 was manufactured by performing steps (1) to (6) below. The same liquid crystal orientation agent was used as Working Example 5. The display mode of this liquid crystal display element was VATN mode, and the pixels were formed so as to include a plurality of domains each. In addition, PSA treatment was performed.

(1) A glass substrate (TFT substrate) that is 0.7 mm in thickness and has TFT elements and indium tin oxide (ITO) transparent electrodes was prepared, and a glass substrate (color filter substrate) that is 0.7 mm in thickness and has a black matrix, color filters, photospacers, and an ITO transparent electrode was prepared.

(2) A liquid crystal orientation agent was coated by the injection method onto the surfaces of both substrates, which have been washed, on which the transparent electrodes were to be formed. Next, the substrates were pre-dried for 2 minutes at 80° C. Then, the substrates were baked for 40 minutes at 200° C. in a nitrogen atmosphere, after which the substrates were cooled to room temperature, and a coated film was formed to a thickness of 100 nm. In primarily the baking step, the polyamic acid in the liquid crystal orientation agent was thermally imidized such that a portion thereof became a polyimide.

(3) Then, alignment treatment was performed on the surfaces of the respective substrates by radiating thereon linearly polarized ultraviolet light having a wavelength of 313 nm and an extinction ratio of 10:1 from a direction inclined by 40° with respect to a line normal to the substrate and at an energy of 20 mJ/cm$^2$, thereby attaining the alignment films. When radiating linearly polarized ultraviolet light, a photomask was used to perform alignment treatment such that each pixel was divided into four domains.

(4) A dispenser was used to draw onto one substrate an ultraviolet curable sealing agent (made by Sekisui Chemical Co. Ltd.; product name: Photolec S-WB). A negative liquid crystal composition (made by Merck; product name: MLC-6610), in which 0.3 mass % of biphenyl-4,4'-diyl bis(2-methyl acrylate) was dissolved, was dripped on a prescribed position on the other substrate. The pair of substrates was arranged such that the polarizing directions of the radiated ultraviolet rays were perpendicular, and then bonded together in a vacuum. Additionally, the sealing agent bonding together the substrates was cured in ultraviolet light.

(5) In order to eliminate flow orientation of the liquid crystal, the liquid crystal cells were heated at 130° C. for 40 minutes, realignment treatment to cause the liquid crystal to enter an isotropic phase was performed, and then, the liquid crystal was cooled down to room temperature. Additionally, non-polarized ultraviolet light was radiated from a black light at 16 J/cm$^2$, thereby attaining the liquid crystal cell. When radiating the ultraviolet light, no voltage was applied to the liquid crystal layer.

(6) A pair of polarizing plates arranged in a crossed Nicols state were arranged such that the polarizing axes thereof match the radiation directions of ultraviolet light radiated on the alignment films, and as a result, manufacturing of the liquid crystal display element was completed.

Working Example 12

A liquid crystal display element of Working Example 12 was manufactured by performing steps (1) to (6) below. The same liquid crystal orientation agent was used as Working Example 5. The display mode of this liquid crystal display element was VATN mode, and the pixels were formed so as to include a plurality of domains each. Additionally, the liquid crystal contained an alkenyl component.

(1) A glass substrate (TFT substrate) that is 0.7 mm in thickness and has TFT elements and indium tin oxide (ITO) transparent electrodes was prepared, and a glass substrate (color filter substrate) that is 0.7 mm in thickness and has a black matrix, color filters, photospacers, and an ITO transparent electrode was prepared.

(2) A liquid crystal orientation agent was coated by the injection method onto the surfaces of both substrates, which have been washed, on which the transparent electrodes were to be formed. Next, the substrates were pre-dried for 2 minutes at 80° C. Then, the substrates were baked for 40 minutes at 200° C. in a nitrogen atmosphere, after which the substrates were cooled to room temperature, and a coated film was formed to a thickness of 100 nm. In primarily the baking step, the polyamic acid in the liquid crystal orientation agent was thermally imidized such that a portion thereof became a polyimide.

(3) Then, alignment treatment was performed on the surfaces of the respective substrates by radiating thereon linearly polarized ultraviolet light having a wavelength of 313 nm and an extinction ratio of 10:1 from a direction inclined by 40° with respect to a line normal to the substrate and at an energy of 20 mJ/cm$^2$, thereby attaining the alignment films. When radiating linearly polarized ultraviolet light, a photomask was used to perform alignment treatment such that each pixel was divided into four domains.

(4) A dispenser was used to draw onto one substrate an ultraviolet curable sealing agent (made by Sekisui Chemical Co. Ltd.; product name: Photolec S-WB). On a prescribed position on the other substrate, a negative liquid crystal composition (made by Merck; product name: MLC-6610) was dripped in which liquid crystal molecules trans-d-propyl-4'-vinyl-1,1'-bicyclohexane containing an alkenyl group were added so as to take up 10 mass % of the entire liquid crystal composition. The pair of substrates was arranged such that the four domains were formed in each pixel, and then bonded together in a vacuum. Additionally, the sealing agent bonding together the substrates was cured in ultraviolet light.

(5) In order to eliminate flow orientation of the liquid crystal, the liquid crystal cells were heated at 130° C. for 40 minutes, realignment treatment to cause the liquid crystal to enter an isotropic phase was performed, and then, the liquid crystal was cooled down to room temperature, thereby attaining the liquid crystal cell.

(6) A pair of polarizing plates arranged in a crossed Nicols state were arranged such that the polarizing axes thereof match the radiation directions of ultraviolet light radiated on the alignment films, and as a result, manufacturing of the liquid crystal display element was completed.

3. Evaluation Test (1)

The liquid crystal display elements of Working Examples 1 to 12 and Comparison Examples 1 to 4 manufactured as described above were subjected to the evaluation tests below. In Evaluation Tests (1) and (2), liquid crystal driver circuits and a backlight were installed onto the liquid crystal display element so as to form a liquid crystal module and then the liquid crystal display element was subjected to the evaluation test. In Evaluation Tests (3) and (4), the evaluation tests were performed not on the completed liquid crystal display element but using substrates after the formation of the alignment films (step (3) above), which is prior to the completion of the liquid crystal display element. The results of the evaluation tests are as summarized in Table 1 below.

(1) Display Unevenness Due to ODF Method (Evaluation of Dripping Unevenness)

Figure 13:
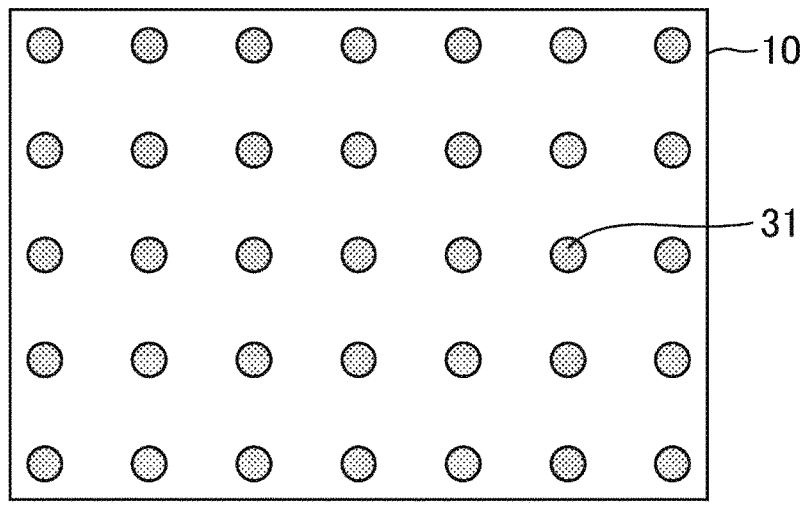
FIG. 13 is a schematic view showing a state in which liquid crystal droplets are disposed on the substrate by ODF.
Figure 14:
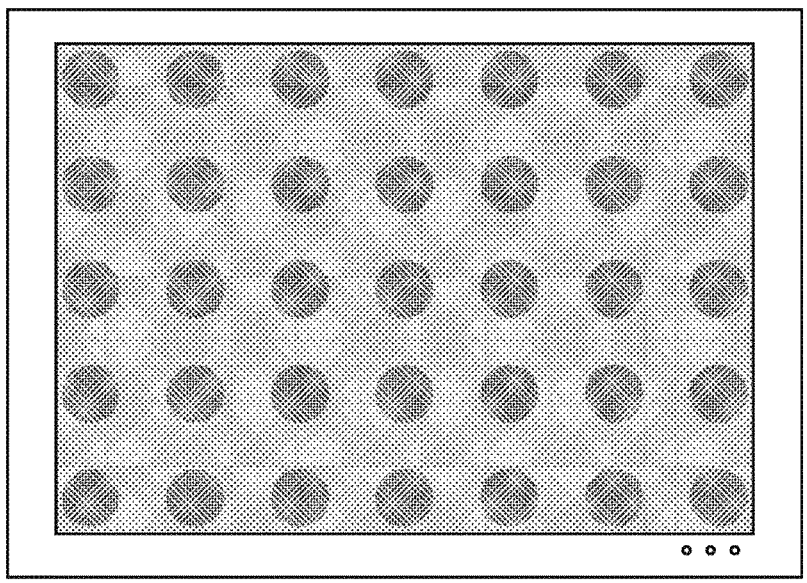
FIG. 14 is a schematic view showing display unevenness resulting from ODF.
Figure 15:
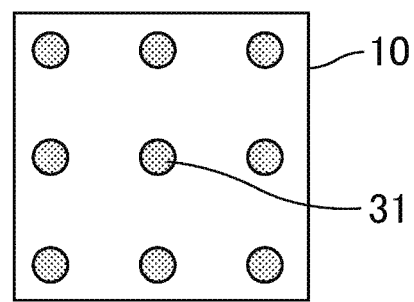
FIG. 15 is a drawing for describing ODF and shows a state in which liquid crystal droplets are dripped on one substrate.
Figure 16:
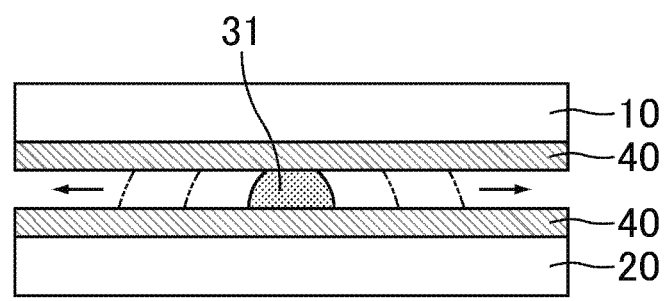
FIG. 16 is a drawing for describing ODF and shows a state in which the pair of substrates are bonded together in a vacuum and the liquid crystal droplets are spread throughout the entire surface of the substrates by pressure.
Figure 17:
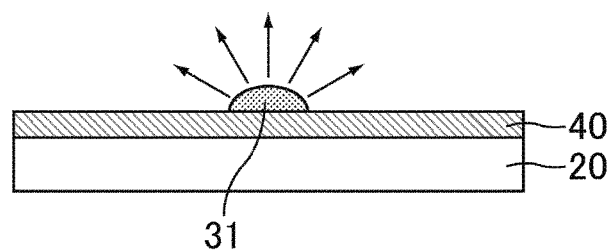
FIG. 17 shows a state in which liquid crystal components have volatilized in the vacuum prior to the liquid crystal droplets being spread.
Figure 18:
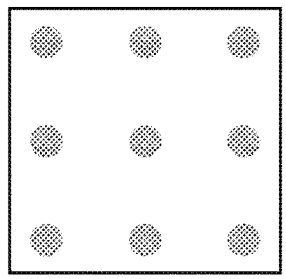
FIGS. 18(a), 18(b), and 18(c) show examples of display unevenness.
Figure 18:
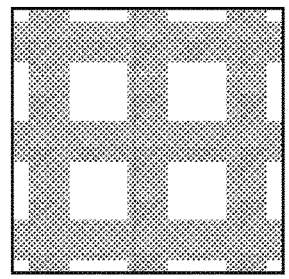
Figure 18:
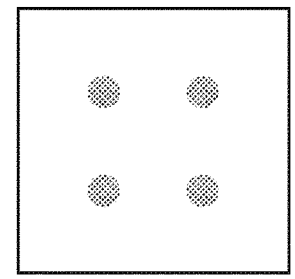
Figure 19:
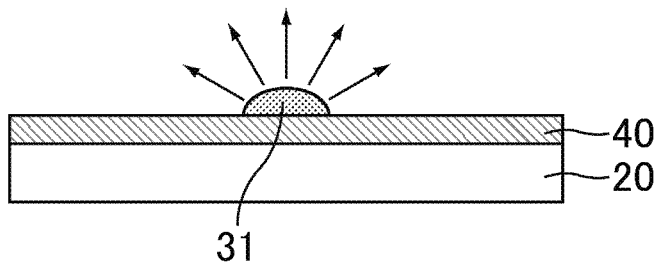
FIG. 19 shows liquid crystal droplets when the surface thereof is large and the volatility is high.
Figure 20:
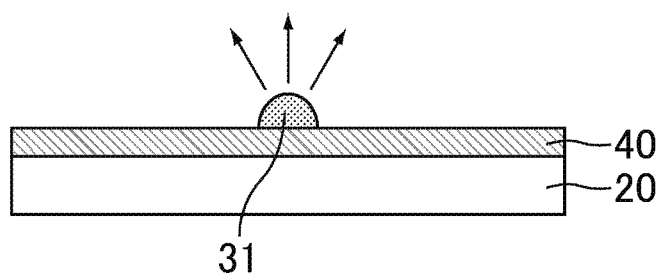
FIG. 20 shows liquid crystal droplets when the surface thereof is small and the volatility is low.
Figure 21:
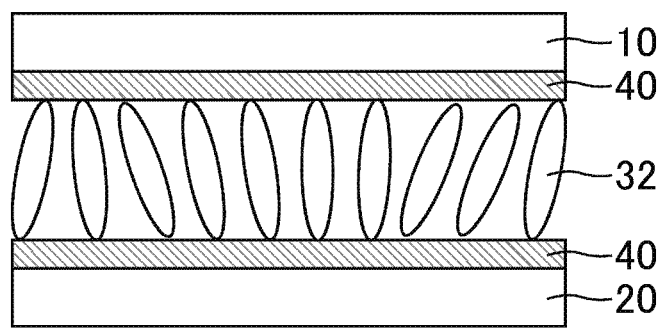
FIG. 21 shows a state in which the vertical alignment of the surface of the alignment film is insufficient and alignment disorder has occurred when spreading the liquid crystal.
Figure 22:
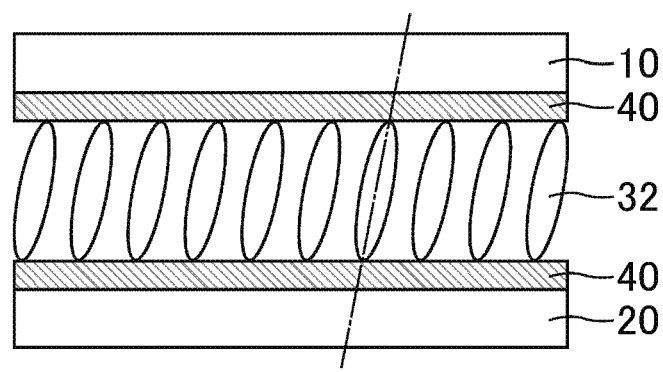
FIG. 22 shows a state in which the vertical alignment of the surface of the alignment film is sufficient and alignment disorder has not occurred when spreading the liquid crystal.

Within a gradation range of 0 (black display) to 255 (white display), the screen was made to display a halftone, which is a gradation of 8 to 126, in which display unevenness is most visible. If a uniform halftone display was not achieved throughout the screen and variation in luminance correlated with the positions where the liquid crystal was dripped during the liquid crystal dripping step was seen, the liquid crystal display element was deemed defective, and if such a variation in luminance was not seen, the liquid crystal display element was deemed non-defective. Specifically, if display unevenness having a pattern such as shown in FIG. 14, corresponding to where the liquid crystal droplets were dripped as shown in FIG. 13, was seen, the liquid crystal display element was deemed to be defective. FIG. 13 is a schematic view showing a state in which liquid crystal droplets are arranged on the substrate by ODF, and FIG. 14 is a schematic view showing display unevenness resulting from ODF.

In Working Examples 1 to 12 and Comparison Example 3, no display unevenness resulting from ODF occurred. On the other hand, in Comparison Examples 1, 2, and 4, display unevenness resulting from ODF did occur. Specifically, as shown in FIG. 14, the liquid crystal arranged as droplets spread, and dark/light unevenness having a pattern that matches this spread occurred.

(2) Alignment Film Coating Unevenness

Within a gradation range of 0 (black display) to 255 (white display), the screen was made to display a halftone, which is a gradation of 8 to 126, in which unevenness is most visible. If a uniform halftone display was not achieved throughout the entire screen and a variation in luminance resulting from streaking unevenness resulting from injection coating was seen, then the liquid crystal display element was deemed defective; if such a variation in luminance was seen in very few regions relative to the entire coating area such as coating edges, then the liquid crystal display element was deemed substantially non-defective, and if no such variation was seen, then the liquid crystal display element was deemed non-defective.

Almost no coating unevenness in the alignment films was seen in Working Example 1, and no coating unevenness in the alignment films of Working Examples 2 to 12 and Comparison Examples 1, 2, and 4 was seen. On the other hand, alignment film coating unevenness did occur in Comparison Example 3. Specifically, unevenness in the form of very narrow streaks corresponding to the interval at which the nozzles discharged the liquid crystal orientation agent in the injection coating direction was seen.

(3) Contact Angle of Liquid Crystal Droplets

A syringe with a needle end of 0.5 mm was used to drip 10 μL of liquid crystal onto the alignment film, and after 1 minute had passed since the liquid crystal was dripped, the contact angle between the alignment film and the liquid crystal droplets was measured. The liquid crystal was dripped three times, and the average of the measured values of the respective droplets was set as the contact angle. The dripped liquid crystal was the same as that used in the liquid crystal layer in the liquid crystal display elements of Working Examples 1 to 12 and Comparison Examples 1 to 4.

After the alignment film was formed on the substrate, the liquid crystal droplets were dripped onto the alignment film of the substrate, and upon measuring the contact angles, it was found that the contact angle was 15° or greater in Working Examples 1 to 12 and Comparison Example 3, and less than 15° in Comparison Examples 1, 2, and 4.

(4) Liquid Crystal Dripping Spread Test

From a height of 3 mm, 10 μL of liquid crystal droplets were dripped onto the alignment film, and after 1 minute elapsed, the diameters of the liquid crystal droplets were measured as an index indicating the degree to which the liquid crystal droplets had spread. The liquid crystal was dripped three times, and the average of the measured values of the respective droplets was set as the "droplet diameter." The dripped liquid crystal was the same as that used in the liquid crystal layer in the liquid crystal display elements of Working Examples 1 to 12 and Comparison Examples 1 to 4.

After the alignment film was formed on the substrate, the liquid crystal droplets were dripped onto the alignment film of the substrate, and upon measuring the droplet diameters, it was found that the droplet diameter was less than 9 mm in Working Examples 1 to 12 and Comparison Example 3, and greater than 9 mm in Comparison Examples 1, 2, and 4.

TABLE 1

|  | ODF Dripping Unevenness | Alignment Film Coating Unevenness | Contact Angle (°) | Drop Diameter (mm) |
| --- | --- | --- | --- | --- |
| Working Example 1 | Non-Defective | Substantially Non-Defective | 19 | 5.5 |

TABLE 1-continued

|  | ODF Dripping Unevenness | Alignment Film Coating Unevenness | Contact Angle (°) | Drop Diameter (mm) |
|---|---|---|---|---|
| Working Example 2 | Non-Defective | Non-Defective | 16 | 8.8 |
| Working Example 3 | Non-Defective | Non-Defective | 16.5 | 8.5 |
| Working Example 4 | Non-Defective | Non-Defective | 16.5 | 8.5 |
| Working Example 5 | Non-Defective | Non-Defective | 17 | 8 |
| Working Example 6 | Non-Defective | Non-Defective | 17 | 8 |
| Working Example 7 | Non-Defective | Non-Defective | 17 | 8 |
| Working Example 8 | Non-Defective | Non-Defective | 17 | 8 |
| Working Example 9 | Non-Defective | Non-Defective | 16.5 | 8.5 |
| Working Example 10 | Non-Defective | Non-Defective | 16.5 | 8.5 |
| Comparison Example 1 | Defective | Non-Defective | 13 | 12 |
| Comparison Example 2 | Defective | Non-Defective | 13 | 10 |
| Comparison Example 3 | Non-Defective | Defective | 20 | 5 |
| Comparison Example 4 | Defective | Non-Defective | 14.5 | 11 |
| Working Example 11 | Non-Defective | Non-Defective | 17 | 8 |
| Working Example 12 | Non-Defective | Non-Defective | 16 | 8.8 |

4. Manufacturing Liquid Crystal Display Element (2)

Working Example 13

Aside from the baking temperature of the liquid crystal orientation agent being changed to 190° C., a liquid crystal display element similar to that of Working Example 3 was manufactured. That is, the liquid crystal orientation agent of Synthesis Example 3 was used, and when manufacturing the liquid crystal display element, the liquid crystal orientation agent coated by the injection method was dried for 2 minutes at 80° C., after which it was baked for 40 minutes at 190° C. in a nitrogen atmosphere.

Working Example 14

Aside from the baking temperature of the liquid crystal orientation agent being changed to 230° C., a liquid crystal display element similar to that of Working Example 3 was manufactured. That is, the liquid crystal orientation agent of Synthesis Example 3 was used, and when manufacturing the liquid crystal display element, the liquid crystal orientation agent coated by the injection method was dried for 2 minutes at 80° C., after which it was baked for 40 minutes at 230° C. in a nitrogen atmosphere.

Working Example 15

Aside from the baking temperature of the liquid crystal orientation agent being changed to 250° C., a liquid crystal display element similar to that of Working Example 3 was manufactured. That is, the liquid crystal orientation agent of Synthesis Example 3 was used, and when manufacturing the liquid crystal display element, the liquid crystal orientation agent coated by the injection method was dried for 2 minutes at 80° C., after which it was baked for 40 minutes at 250° C. in a nitrogen atmosphere.

Working Example 16

Aside from the baking conditions for the liquid crystal orientation agent being modified to a two-step process including baking for 10 minutes at 190° C., and then baking for 30 minutes at 200° C., a liquid crystal display element similar to that of Working Example 3 was manufactured. That is, the liquid crystal orientation agent of Synthesis Example 3 was used, and when manufacturing the liquid crystal display element, the liquid crystal orientation agent coated by the injection method was dried for 2 minutes at 80° C., after which it was baked in a two-step process whereby the liquid crystal orientation agent was baked for 10 minutes at 190° C. and then baked for 30 minutes at 200° C. in a nitrogen atmosphere.

Working Example 17

Aside from the baking conditions for the liquid crystal orientation agent being modified to a two-step process including baking for 10 minutes at 140° C., and then baking for 30 minutes at 200° C., a liquid crystal display element similar to that of Working Example 3 was manufactured. That is, the liquid crystal orientation agent of Synthesis Example 3 was used, and when manufacturing the liquid crystal display element, the liquid crystal orientation agent coated by the injection method was dried for 2 minutes at 80° C., after which it was baked in a two-step process whereby the liquid crystal orientation agent was baked for 10 minutes at 140° C. and then baked for 30 minutes at 200° C. in a nitrogen atmosphere.

Working Example 18

Aside from the baking conditions for the liquid crystal orientation agent being modified to a two-step process including baking for 10 minutes at 140° C., and then baking for 30 minutes at 230° C., a liquid crystal display element similar to that of Working Example 3 was manufactured. That is, the liquid crystal orientation agent of Synthesis Example 3 was used, and when manufacturing the liquid crystal display element, the liquid crystal orientation agent coated by the injection method was dried for 2 minutes at 80° C., after which it was baked in a two-step process whereby the liquid crystal orientation agent was baked for 10 minutes at 140° C. and then baked for 30 minutes at 230° C. in a nitrogen atmosphere.

5. Evaluation Test (2)

The following tests (1) to (6) were performed on the liquid crystal display element of Working Examples 3 and 13 to 18. The results of the tests are as summarized in Tables 2 and 3 below.

(1) Display Unevenness due to ODF
(2) Alignment Film Coating Unevenness
(3) Contact Angle of Liquid Crystal Droplets
(4) Liquid Crystal Dripping Spread Test
(5) Hardness of Film
(6) Reliability of Liquid Crystal Display Device The tests (1) to (4) were as described in the evaluation test (1). The tests (5) and (6) are as described below.

(5) Hardness of Film

The wooden portion of a pencil (Mitsubishi pencil "Uni") was scraped away with the pencil core being kept in a cylindrical shape without being scraped away. The end thereof was polished with sandpaper to create a smooth and circular cross-section. The pencil was set at 45° incline in relation to a sample surface, and the pencil core was moved at least 7 mm at a speed of 0.5 to 1.0 mm/s while being pressed against the sample surface. At this time, the load was maintained at 750±10 g. The film hardness was determined according to the type of pencil having the hardest core that did not leave any damage on the film.

(6) Reliability of Liquid Crystal Display Device

The liquid crystal display device was kept in an illumination state (white display state) in a 100° C. environment. After a certain period of time elapsed, the temperature was lowered to 60° C. and the display screen was observed during halftone display to confirm the presence or lack of discoloration.

Additional Notes

Examples of suitable aspects of the liquid crystal display device of the present invention will be given below. The respective examples may be appropriately combined within a scope that does not depart from the gist of the present invention.

It is preferable that the amount of the first side chain be less than 0.5 mol relative to the 1 mol of silicon atoms in the siloxane main chain. With the amount being less than 0.5 mol, it is possible to effectively prevent coating unevenness of the alignment film. In addition, it is preferable that the amount of the first side chain be 0.03 mol or greater relative to the 1 mol of silicon atoms in the siloxane. If the amount is 0.03 mol or greater, then when dripping the liquid crystal by ODF, it is possible to effectively mitigate volatilization of liquid crystal components, and to mitigate the occurrence of display unevenness in the liquid crystal display device. It is more preferable that the amount of the first side chain be 0.04 mol or greater and even more preferable that the amount be 0.05 mol or greater. Also, it is preferable that the

TABLE 2

| | Baking Temperature (° C.) | ODF Dripping Unevenne | Alignment Film Coating | Contact Angle (°) | Droplet Diameter (mm) | Film Hardness | Reliability |
|---|---|---|---|---|---|---|---|
| Working Example 13 | 190 | Non-Defective | Non-Defective | 16 | 8.8 | 2H | Discoloration after 100 hours |
| Working Example 3 | 200 | Non-Defective | Non-Defective | 16.5 | 8.5 | 3H | No discoloration until after 3000 hours |
| Working Example 14 | 230 | Non-Defective | Non-Defective | 17.5 | 7.7 | 4H | No discoloration until after 5000 hours |
| Working Example 15 | 250 | Non-Defective | Non-Defective | 18 | 7.3 | 4H | No discoloration until after 5000 hours |

TABLE 3

| | First Baking Temperature (° C.) | Final Baking Temperature (° C.) | ODF Dripping Unevenness | Alignment Film Coating Unevenness | Contact Angle (°) | Droplet Diameter (mm) | Film Hardness | Reliability |
|---|---|---|---|---|---|---|---|---|
| Working Example 16 | 190 | 200 | Non-Defective | Non-Defective | 16.3 | 8.5 | 3H | No discoloration until after 3000 hours |
| Working Example 17 | 140 | 200 | Non-Defective | Non-Defective | 16.3 | 8.5 | 3H | No discoloration until after 3000 hours |
| Working Example 18 | 140 | 230 | Non-Defective | Non-Defective | 17.2 | 7.8 | 4H | No discoloration until after 5000 hours |

As indicated in Tables 2 and 3, there was no display unevenness resulting from ODF or coating unevenness of the alignment film in any of Working Examples 3 and 13 to 18, the contact angle was 15° or greater, the droplet diameter was less than 9 mm, and all values were within allowable ranges. The higher the baking temperature was set, the harder and more reliable the film was. This is thought to be because with higher baking temperatures, the density of the alignment film increases. In particular, in Working Examples 3, 14, and 15 with baking temperatures of 200° C. or greater and Working Examples 16, 17, and 18 where the temperature during the last baking stage was 200° C. or greater, the reliability was greatly improved.

amount of the first side chain be less than 0.4 mol and even more preferable that the amount be less than 0.3 mol.

It is preferable that the first side chain have on the end thereof a fluoroalkyl group with a carbon number of 10 or less. It is preferable that the second side chain have on the end thereof an alkyl group with a carbon number of 10 or less. In this manner, it is possible to attain sufficient orientation control force and prevent burn-in. It is preferable that the first side chain have on the end thereof a fluoroalkyl group with a carbon number of 10 or less, and that the second side chain have on the end thereof an alkyl group with a carbon number of 10 or less.

It is preferable that the first side chain and the second side chain not include an imide structure. If the side chain of the polymer constituting the first component has an imide structure, this increases affinity with the imide structure included in the second component, which results in weaker orientation control force and an increase in the risk of ODF unevenness.

It is preferable that the first side chain and the second side chain include a photofunctional group (a group having the function of applying orientation as a result of light irradiation). By the first side chain and the second side chain including a photofunctional group, the alignment film can be made into a photoalignment film to which photoalignment treatment can be applied.

It is preferable that the first side chain and the second side chain not include a steroid structure but include a photofunctional group. Steroid structures are bulky, which can interfere with the photoreaction of the photofunctional group, and in such a case, orientation control in a desired direction is not sufficiently applied. Thus, if a steroid structure is used as the end of the photosensitive side chain, there is a risk that a sufficient orientation control force cannot be attained and susceptibility to ODF unevenness is increased.

It is preferable that the photofunctional group be of the photoisomerization type or photodimerization type. Examples of mechanisms to apply an orientation by light irradiation include the photolythic type, the photoisomerization type, or the photodimerization type, but breakdown products generated by the photolythic type result in decreased reliability, and thus, a material that exhibits orientation control force by the isomerization reaction or the crosslinking reaction resulting from light absorption is preferred. There is no special limitation on the type of photofunctional group, and examples thereof include photosensitive groups such as a 4-chalcone group, a 4'-chalcone group, a coumarin group, a cinnamoyl group, a stilbene group, and an azobenzene group, but among these, the cinnamate group or a derivative thereof is preferred. The cinnamate group ($C_6H_5$—CH=CH—COO—) has the advantage of being easy to synthesize.

It is preferable that the alignment film have alignment treatment performed thereon by light irradiation (photoalignment film). Photoalignment treatment is a liquid crystal orientation method with excellent in-plane uniformity and high reliability due to being dustless. Alignment treatment is performed directly on the alignment film, and thus, orientation control units such as protrusions and structures become unnecessary and causes for reduction in transmittance can be eliminated, enabling high transmittance. Ultraviolet light, visible light, or both are examples of the above-mentioned light. The light may be polarized or non-polarized.

It is preferable that the liquid crystal display device have pixels arranged in a matrix and including pixel electrodes arranged in a matrix facing the liquid crystal layer on one of the pair of substrates, and a common electrode disposed facing the liquid crystal layer on the other substrate, and that each of the pixels have two or more domains arranged adjacent to each other. Such a configuration is suited to attaining a wide viewing angle.

It is preferable that the liquid crystal display device be of the vertical alignment mode. In this manner, it is possible to attain a high contrast liquid crystal display device.

It is preferable that the liquid crystal display device be of a four-domain VATN mode. In this manner, it is possible to attain a liquid crystal display device with a high manufacturing efficiency and a high transmittance.

It is preferable that the liquid crystal layer be constituted of liquid crystal molecules having negative dielectric anisotropy. In this manner, it is possible to attain a four-domain VATN mode liquid crystal display device having a high transmittance.

It is preferable that the liquid crystal display device have at least either of a slit provided in each of the pixel electrodes and a microstructure (structure for controlling liquid crystal orientation) provided on each of the pixel electrodes, that the liquid crystal display device have pixels arranged in a matrix, and that the pixels have two or more adjacent domains. Such a configuration is suited to attaining a wide viewing angle. Even with an alignment film having a photosensitive group, the alignment film need not rely on light irradiation for alignment treatment.

It is preferable that the proportion of the first component contained be 30 mass % or less in relation to the amount of the second component contained. If this proportion exceeds 30 mass %, there is a risk that residual DC worsens and that there is increased susceptibility to residual images from burn-in. It is preferable that the first component take up 27 mass % or less and even more preferable that the first component take up 25 mass % or less. It is preferable that the proportion of the first component contained be 2 mass % or greater in relation to the amount of the second component contained. If the proportion is 2 mass % or greater, it is possible to attain to a sufficient degree the effects by the first component of improving heat resistance and light resistance. The usage environment of liquid crystal display devices has become increasingly harsh, and siloxane, due to its structure, allows for high heat resistance and high light resistance. It is more preferable that the first component take up 2.5 mass % or greater and even more preferable that the first component take up 3 mass % or greater.

It is preferable that the viscosity of the liquid crystal layer at 20° C. be 20 mPa·s or less. In this manner, a liquid crystal display device having fast optical response and suited to high frequency driving or large screen driving can be attained. It is more preferable that the viscosity be 19.5 mPa·s or less and even more preferable that the viscosity be 19 mPa·s or less. It is preferable that the viscosity of the liquid crystal layer at 20° C. be 10 mPa·s or greater. If the viscosity is 10 mPa·s or greater, during the liquid crystal dripping step, it is possible to drip the liquid crystal droplets in desired dripping locations with the amount per droplet being stable, enabling an increase in manufacturing efficiency. It is more preferable that the viscosity be 10.5 mPa·s or greater and even more preferable that the viscosity be 11 mPa·s or greater.

It is preferable that the liquid crystal layer contain liquid crystal molecules including in the molecular structure thereof mulendle bonds other than the conjugated double bonds of the benzene ring. Such liquid crystal molecules can be made to have low viscosity, and thus, a liquid crystal display device having fast optical response and suited to high frequency driving or large screen driving can be attained. There are other effects such as improvement in steepness of the voltage (V)-transmittance (T) curve. Examples of the mulendle bond include a double bond between carbon atoms and a triple bond between carbon atoms. An example of liquid crystal molecules is those that include in the molecular structure thereof an alkenyl group.

It is preferable that the surface of the alignment film facing the liquid crystal layer be formed such that the contact angle of liquid crystal droplets thereon is 15° or greater. If the contact angle is less than 15°, the surface area of the liquid crystal droplets becomes greater, resulting in an increase in susceptibility to low viscosity components in the liquid crystal volatilizing and dripping unevenness occurring. It is more preferable that the contact angle be 15.5° or greater and even more preferable that the contact angle be 16° or greater. In addition, it is preferable that the surface of the alignment film facing the liquid crystal layer be made such that the contact angle of liquid crystal droplets thereon is 40° or less. If the contact angle exceeds 40°, it becomes difficult to spread the liquid crystal droplets evenly on the substrate. It is preferable that the contact angle be 39° or less and even more preferable that the contact angle be 35° or less.

It is preferable that the alignment film have surface characteristics such that when 10 µL of liquid crystal droplets are dripped from a height of 3 mm onto the surface facing the liquid crystal layer, the diameter of the droplets on the surface as measured after 1 minute is less than 9 mm. If the diameter is 9 mm or greater, the surface area of the liquid crystal droplets becomes greater, resulting in an increase in susceptibility to low viscosity components in the liquid crystal volatilizing and dripping unevenness occurring. It is more preferable that the diameter be less than 8.9 mm and even more preferable that the diameter be less than 8.5 mm. Also, it is preferable that the alignment film have surface characteristics whereby the diameter is 4 mm or greater. If the diameter is less than 4 mm, it becomes difficult to spread the liquid crystal droplets evenly on the substrate. It is more preferable that the diameter be 4.1 mm or greater and even more preferable that the diameter be 4.5 mm or greater.

It is preferable that the thickness of the alignment film be 40 nm to 150 nm inclusive. If the thickness is less than 40 nm, then the orientation control force becomes insufficient, and orientation is non-uniform due to the pressure of the liquid crystal spreading during drip injection, which poses the risk of unevenness in dripping. It is more preferable that the thickness be 45 nm or greater and even more preferable that the thickness be 50 nm or greater. If the thickness exceeds 150 nm, then it is difficult to form the film uniformly, which can result in coating unevenness. It is more preferable that the thickness be 145 nm or less and even more preferable that the thickness be 140 nm or less.

It is preferable that the liquid crystal display device further have an LED backlight. LED backlights do not emit ultraviolet light, and thus, no radicals are generated from the alignment film and the liquid crystal material, and no change in molecular structure such as degradation occurs, allowing for a highly reliable liquid crystal display device to be attained.

It is preferable that the liquid crystal display device further have a polymer layer for controlling orientation of the liquid crystal molecules in the vicinity thereof, the polymer layer being disposed on the side of the alignment film facing the liquid crystal layer. It is preferable that the polymer layer be formed by monomers added into the liquid crystal layer being polymerized. In this manner, it is possible to perform sufficient orientation control of the liquid crystal in the liquid crystal layer. In addition, there is no need to provide orientation control units such as protrusions and structures, and thus, it is possible to eliminate causes for decreased transmittance.

It is preferable that the monomer have at least one polymerizable functional group selected from a group including an acrylate group, a methacrylate group, a vinyl group, a vinyloxy group, and an epoxy group. The monomers having these polymerizable functional groups are suited to being added into the liquid crystal layer and being polymerized by light irradiation.

Examples of suitable aspects of the method of manufacturing a liquid crystal display device of the present invention will be given below. The respective examples may be appropriately combined within a scope that does not depart from the gist of the present invention.

It is preferable that the step of forming the alignment film include baking the alignment film formed on the surface, and that the baking temperature be 200° C. to 250° C. inclusive. Even if the baking temperature is less than 200° C., it is possible to prevent unevenness in dripping due to ODF or coating unevenness of the alignment film, but by having the baking temperature be 200° C. or greater, it is possible to improve reliability of the liquid crystal display element. Also, if the baking temperature exceeds 250° C., then the load on the heating device for baking and on the device for conveying the substrate from the heating device becomes high, which can result in deterioration in quality of the color filters and other components included in the liquid crystal display element. Baking may be performed in only one step or in mulendle steps (two or more steps with differing heating temperatures). By performing mulendle step baking, it is possible to mitigate deterioration in quality of other components. The respective steps in the mulendle step baking correspond to the state at which the alignment film is held for a certain period of time in an environment set at a certain temperature. In mulendle step baking, it is preferable that, in the step with the highest heating temperature, the temperature be 200° C. to 250° C. inclusive. It is preferable that the mulendle step baking be performed such that the temperature rises continuously from the low temperature step to the high temperature step. If no step is provided for temperature reduction, then it is preferable that the baking temperature in the final step be the highest. An example of a preferable aspect of steps of forming the alignment film is an aspect that includes baking of the alignment film formed on the surface, the baking including two or more steps with differing heating temperatures, the temperature at the step with the highest heating temperature during baking being 200° C. to 250° C. inclusive.

It is preferable that the amount of the first side chain be less than 0.5 mol relative to the 1 mol of silicon atoms in the siloxane main chain. With the amount being less than 0.5 mol, it is possible to effectively prevent coating unevenness of the alignment film. In addition, it is preferable that the amount of the first side chain be 0.03 mol or greater relative to the 1 mol of silicon atoms in the siloxane. If the amount is 0.03 mol or greater, then when dripping the liquid crystal by ODF, it is possible to effectively mitigate volatilization of liquid crystal components, and to mitigate the occurrence of display unevenness in the liquid crystal display device. It is more preferable that the amount of the first side chain be 0.04 mol or greater and even more preferable that the amount be 0.05 mol or greater. Also, it is preferable that the amount of the first side chain be less than 0.4 mol and even more preferable that the amount be less than 0.3 mol.

It is preferable that the first side chain have on the end thereof a fluoroalkyl group with a carbon number of 10 or less. It is preferable that the second side chain have on the end thereof an alkyl group with a carbon number of 10 or less. In this manner, it is possible to attain sufficient orientation control force and prevent burn-in. It is preferable that the first side chain have on the end thereof a fluoroalkyl group with a carbon number of 10 or less, and that the second side chain have on the end thereof an alkyl group with a carbon number of 10 or less.

It is preferable that the first side chain and the second side chain not include an imide structure. If the side chain of the polymer constituting the first component has an imide structure, this increases affinity with the imide structure included in the second component, which results in weaker orientation control force and an increase in the risk of ODF unevenness.

It is preferable that the first side chain and the second side chain include a photofunctional group. By the first side chain and the second side chain including a photofunctional group, the alignment film can be made into a photoalignment film to which photoalignment treatment can be applied.

It is preferable that the first side chain and the second side chain not include a steroid structure but include a photofunctional group. Steroid structures are bulky, which can interfere with the photoreaction of the photofunctional group, and in such a case, orientation control in a desired direction is not sufficiently applied. Thus, if a steroid structure is used as the end of the photosensitive side chain, there is a risk that a sufficient orientation control force cannot be attained and susceptibility to ODF unevenness is increased.

It is preferable that the photofunctional group be of the photoisomerization type or photodimerization type. Examples of mechanisms to apply an orientation by light irradiation include the photolythic type, the photoisomerization type, or the photodimerization type, but breakdown products generated by the photolythic type result in decreased reliability, and thus, a material that exhibits orientation control force by the isomerization reaction or the crosslinking reaction resulting from light absorption is preferred. There is no special limitation on the type of photofunctional group, and examples thereof include photosensitive groups such as a 4-chalcone group, a 4'-chalcone group, a coumarin group, a cinnamoyl group, a stilbene group, and an azobenzene group, but among these, the cinnamate group or a derivative thereof is preferred. The cinnamate group ($C_6H_5$—CH=CH—COO—) has the advantage of being easy to synthesize.

It is preferable that the steps of forming the alignment film include alignment treatment by light irradiation. Photoalignment treatment is an alignment treatment with excellent in-plane uniformity and high reliability due to being dustless. Alignment treatment is performed directly on the alignment film, and thus, orientation control units such as protrusions and structures become unnecessary and causes for reduction in transmittance can be eliminated, enabling high transmittance. Ultraviolet light, visible light, or both are examples of the above-mentioned light. The light may be polarized or non-polarized.

It is preferable that the liquid crystal display device have pixels arranged in a matrix and including pixel electrodes arranged in a matrix facing the liquid crystal layer on one of the pair of substrates, and a common electrode disposed facing the liquid crystal layer on the other substrate, and that each of the pixels have two or more domains arranged adjacent to each other. Such a configuration is suited to attaining a wide viewing angle.

It is preferable that the liquid crystal display device be of the vertical alignment mode. In this manner, it is possible to attain a high contrast liquid crystal display device.

It is preferable that the liquid crystal display device be of a four-domain VATN mode. In this manner, it is possible to attain a liquid crystal display device with a high manufacturing efficiency and a high transmittance.

It is preferable that the liquid crystal layer be constituted of liquid crystal molecules having negative dielectric anisotropy. In this manner, it is possible to attain a four-domain VATN mode liquid crystal display device having a high transmittance.

It is preferable that the liquid crystal display device have at least either of a slit provided in each of the pixel electrodes and a microstructure provided on each of the pixel electrodes, that the liquid crystal display device have pixels arranged in a matrix, and that the pixels have two or more adjacent domains. Such a configuration is suited to attaining a wide viewing angle. Even with an alignment film having a photosensitive group, the alignment film need not rely on light irradiation for alignment treatment.

It is preferable that the proportion of the first component contained be 30 mass % or less in relation to the amount of the second component contained. If this proportion exceeds 30 mass %, there is a risk that residual DC worsens and that there is increased susceptibility to residual images from burn-in. It is preferable that the first component take up 27 mass % or less and even more preferable that the first component take up 25 mass % or less. It is preferable that the proportion of the first component contained be 2 mass % or greater in relation to the amount of the second component contained. If the proportion is 2 mass % or greater, it is possible to attain to a sufficient degree the effects by the first component of improving heat resistance and light resistance. It is more preferable that the first component take up 2.5 mass % or greater and even more preferable that the first component take up 3 mass % or greater.

It is preferable that the viscosity of the liquid crystal layer at 20° C. be 20 mPa·s or less. In this manner, a liquid crystal display device having fast optical response and suited to high frequency driving or large screen driving can be attained. It is more preferable that the viscosity be 19.5 mPa·s or less and even more preferable that the viscosity be 19 mPa·s or less. It is preferable that the viscosity of the liquid crystal layer at 20° C. be 10 mPa·s or greater. If the viscosity is 10 mPa·s or greater, during liquid crystal dripping, it is possible to drip the liquid crystal droplets in desired dripping locations with the amount per droplet being stable, enabling an increase in manufacturing efficiency. It is preferable that the viscosity be 10.5 mPa·s or greater and even more preferable that the viscosity be 11 mPa·s or greater.

It is preferable that the liquid crystal layer contain liquid crystal molecules including in the molecular structure thereof mulendle bonds other than the conjugated double bonds of the benzene ring. Such liquid crystal molecules can be made to have low viscosity, and thus, a liquid crystal display device having fast optical response and suited to high frequency driving or large screen driving can be attained. There are other effects such as improvement in steepness of the voltage (V)-transmittance (T) curve. Examples of the mulendle bond include a double bond between carbon atoms and a triple bond between carbon atoms. An example of liquid crystal molecules is those that include in the molecular structure thereof an alkenyl group.

It is preferable that the surface of the alignment film facing the liquid crystal layer be formed such that the contact angle of liquid crystal droplets thereon is 15° or greater. If the contact angle is less than 15°, the surface area of the liquid crystal droplets becomes greater, resulting in an increase in susceptibility to low viscosity components in the liquid crystal volatilizing and dripping unevenness occurring. It is more preferable that the contact angle be 15.5° or greater and even more preferable that the contact angle be 16° or greater. Also, it is preferable that the surface of the alignment film facing the liquid crystal layer be made such that the contact angle of liquid crystal droplets thereon is 40° or less. If the contact angle exceeds 40°, it becomes difficult to spread the liquid crystal droplets evenly on the substrate. It is preferable that the contact angle be 39° or less and even more preferable that the contact angle be 35° or less.

It is preferable that the alignment film have surface characteristics such that when 10 μL of liquid crystal droplets are dripped from a height of 3 mm onto the surface facing the liquid crystal layer, the diameter of the droplets on the surface as measured after 1 minute is less than 9 mm. If the diameter is 9 mm or greater, the surface area of the liquid crystal droplets becomes greater, resulting in an increase in susceptibility to low viscosity components in the liquid crystal volatilizing and dripping unevenness occurring. It is more preferable that the diameter be less than 8.9 mm and even more preferable that the diameter be less than 8.5 mm. In addition, it is preferable that the alignment film have surface characteristics whereby the diameter is 4 mm or greater. If the diameter is less than 4 mm, it becomes difficult to spread the liquid crystal droplets evenly on the substrate. It is more preferable that the diameter be 4.1 mm or greater and even more preferable that the diameter be 4.5 mm or greater.

It is preferable that the thickness of the alignment film be 40 nm to 150 nm inclusive. If the thickness is less than 40 nm, then the orientation control force becomes insufficient, and orientation is non-uniform due to the pressure of the liquid crystal spreading during drip injection, which poses the risk of unevenness in dripping. It is preferable that the thickness be 45 nm or greater and even more preferable that the thickness be 50 nm or greater. If the thickness exceeds 150 nm, then it is difficult to form the film uniformly, which can result in coating unevenness. It is more preferable that the thickness be 145 nm or less and even more preferable that the thickness be 140 nm or less.

It is preferable that the liquid crystal display device further have an LED backlight. LED backlights do not emit ultraviolet light, and thus, no radicals are generated from the alignment film and the liquid crystal material, and no change in molecular structure such as degradation occurs, allowing for a highly reliable liquid crystal display device to be attained.

It is preferable that the liquid crystal display device further have a polymer layer for controlling orientation of the liquid crystal molecules in the vicinity thereof, the polymer layer being disposed on the side of the alignment film facing the liquid crystal layer. It is preferable that the polymer layer be formed by monomers added into the liquid crystal layer being polymerized. In this manner, it is possible to perform sufficient orientation control of the liquid crystal in the liquid crystal layer. Also, there is no need to provide orientation control units such as protrusions and structures, and thus, it is possible to eliminate causes for decreased transmittance.

It is preferable that the monomer have at least one polymerizable functional group selected from a group including an acrylate group, a methacrylate group, a vinyl group, a vinyloxy group, and an epoxy group. The monomers having these polymerizable functional groups are suited to being added into the liquid crystal layer and being polymerized by light irradiation.

Examples of suitable aspects of the liquid crystal orientation agent of the present invention will be given below. The respective examples may be appropriately combined within a scope that does not depart from the gist of the present invention.

It is preferable that the amount of the first side chain be less than 0.5 mol relative to the 1 mol of silicon atoms in the siloxane main chain. With the amount being less than 0.5 mol, it is possible to effectively prevent coating unevenness of the alignment film. In addition, it is preferable that the amount of the first side chain be 0.03 mol or greater relative to the 1 mol of silicon atoms in the siloxane. If the amount is 0.03 mol or greater, then when dripping the liquid crystal by ODF, it is possible to effectively mitigate volatilization of liquid crystal components, and to mitigate the occurrence of display unevenness in the liquid crystal display device. It is more preferable that the amount of the first side chain be 0.04 mol or greater and even more preferable that the amount be 0.05 mol or greater. Also, it is more preferable that the amount of the first side chain be less than 0.4 mol and even more preferable that the amount be less than 0.3 mol.

It is preferable that the first side chain have on the end thereof a fluoroalkyl group with a carbon number of 10 or less. It is preferable that the second side chain have on the end thereof an alkyl group with a carbon number of 10 or less. In this manner, it is possible to attain sufficient orientation control force and prevent burn-in. It is preferable that the first side chain have on the end thereof a fluoroalkyl group with a carbon number of 10 or less, and that the second side chain have on the end thereof an alkyl group with a carbon number of 10 or less.

It is preferable that the first side chain and the second side chain not include an imide structure. If the side chain of the polymer constituting the first component has an imide structure, this increases affinity with the imide structure included in the second component, which results in weaker orientation control force and an increase in the risk of ODF unevenness.

It is preferable that the first side chain and the second side chain include a photofunctional group. By the first side chain and the second side chain including a photofunctional group, the alignment film can be made into a photoalignment film to which photoalignment treatment can be applied.

It is preferable that the first side chain and the second side chain not include a steroid structure but include a photofunctional group. Steroid structures are bulky, which can interfere with the photoreaction of the photofunctional group, and in such a case, orientation control in a desired direction is not sufficiently applied. Thus, if a steroid structure is used as the end of the photosensitive side chain, there is a risk that a sufficient orientation control force cannot be attained and susceptibility to ODF unevenness is increased.

It is preferable that the photofunctional group be of the photoisomerization type or photodimerization type. Examples of mechanisms to apply an orientation by light irradiation include the photolythic type, the photoisomerization type, or the photodimerization type, but breakdown products generated by the photolythic type result in decreased reliability, and thus, a material that exhibits orientation control force by the isomerization reaction or the crosslinking reaction resulting from light absorption is preferred. There is no special limitation on the type of photofunctional group, and examples thereof include photosensitive groups such as a 4-chalcone group, a 4'-chalcone group, a coumarin group, a cinnamoyl group, a stilbene group, and an azobenzene group, but among these, the cinnamate group or a derivative thereof is preferred. The cinnamate group ($C_6H_5$—CH=CH—COO—) has the advantage of being easy to synthesize.

It is preferable that the proportion of the first component contained be 30 mass % or less in relation to the amount of the second component contained. If this proportion exceeds 30 mass %, there is a risk that residual DC worsens and that there is increased susceptibility to residual images from burn-in. It is preferable that the first component take up 28 mass % or less and even more preferable that the first component take up 25 mass % or less. Also, it is preferable that the proportion of the first component contained be 2 mass % or greater in relation to the amount of the second component contained. If the proportion is 2 mass % or greater, it is possible to attain to a sufficient degree the effects by the first component of improving heat resistance and light resistance. It is more preferable that the first component take up 2.5 mass % or greater and even more preferable that the first component take up 3 mass % or greater.

DESCRIPTION OF REFERENCE CHARACTERS 10, 20 substrate
30 liquid crystal layer
31 liquid crystal droplet
32 liquid crystal molecule
40 alignment film
50 sealing member
60 polarizing plate
110 alignment film
111 liquid crystal molecule
112 upper and lower substrates
113 photomask
114 light-shielding portion
115 absorption axis direction of polarizing plate disposed on upper substrate
116 absorption axis direction of polarizing plate disposed on lower substrate
117 liquid crystal director direction
203 polymerizable monomer
210 array substrate
211 transparent substrate
212 alignment film
213 PS layer
214 pixel electrode
215 common electrode
220 color filter substrate
221 transparent substrate
222 alignment film
223 PS layer
230 liquid crystal layer

What is claimed is:

1. A liquid crystal display device, comprising:
a pair of substrates; a liquid crystal layer sandwiched between the pair of substrates; and an alignment film disposed between at least one of the pair of substrates and the liquid crystal layer,
wherein the alignment film includes at least a first layer on a side of the liquid crystal layer and a second layer on a side of said at least one of the pair of substrates, the first layer including a first component and the second layer including a second component,
wherein the first component is a polymer in which at least two types of liquid crystal orientation side chains are bonded to a polysiloxane main chain,
wherein the second component is made of at least one of a polyamic acid and a polyimide,
wherein the at least two types of liquid crystal orientation side chains include a first side chain having on an end thereof a fluorine atom, and a second side chain that does not have on an end thereof a fluorine atom,
wherein a proportion of the first component in relation to a total amount of the second component is 2 mass % or greater, and
wherein, in said liquid crystal display device, liquid crystal is sealed between the pair of substrates by a One Drop Fill scheme.

2. The liquid crystal display device according to claim 1, wherein an amount of the first side chain is less than 0.5 mol relative to 1 mol of silicon atoms in the polysiloxane main chain.

3. The liquid crystal display device according to claim 1, wherein the first side chain has on the end thereof a fluoroalkyl group with a carbon number of 10 or less, and the second side chain has on the end thereof an alkyl group with a carbon number of 10 or less.

4. The liquid crystal display device according to claim 1, wherein the first side chain and the second side chain include a photofunctional group.

5. The liquid crystal display device according to claim 1, wherein the proportion of the first component in relation to the total amount of the second component is 30 mass % or less.

* * * * *